US011633021B2

(12) United States Patent
Takekawa et al.

(10) Patent No.: US 11,633,021 B2
(45) Date of Patent: Apr. 25, 2023

(54) MOLDING APPARATUS AND MANUFACTURING METHOD FOR MOLDED SURFACE FASTENER

(71) Applicant: YKK Corporation, Tokyo (JP)

(72) Inventors: Makoto Takekawa, Toyama (JP); Yoshiyuki Fukuhara, Toyama (JP); Hiroyuki Yamashita, Toyama (JP); Isamu Michihata, Toyama (JP); Yui Hashimoto, Toyama (JP)

(73) Assignee: YKK Corporation, Tokyo (JP)

( * ) Notice: Subject to any disclaimer, the term of this patent is extended or adjusted under 35 U.S.C. 154(b) by 311 days.

(21) Appl. No.: 17/160,065

(22) Filed: Jan. 27, 2021

(65) Prior Publication Data
US 2021/0145133 A1    May 20, 2021

Related U.S. Application Data

(62) Division of application No. 16/500,090, filed as application No. PCT/JP2017/013985 on Apr. 3, 2017, now Pat. No. 11,284,681.

(51) Int. Cl.
*A44B 18/00* (2006.01)
*B29C 48/30* (2019.01)
(Continued)

(52) U.S. Cl.
CPC ...... *A44B 18/0049* (2013.01); *A44B 18/0011* (2013.01); *A44B 18/0069* (2013.01);
(Continued)

(58) Field of Classification Search
CPC ............ A44B 18/0049; A44B 18/0011; A44B 18/0069; A44B 18/0061; B29C 33/42;
(Continued)

(56) References Cited

U.S. PATENT DOCUMENTS 5,685,050 A    11/1997  Murasaki
6,039,911 A     3/2000  Miller et al.
(Continued)

FOREIGN PATENT DOCUMENTS

CN    1357283 A     7/2002
CN    1854544 A    11/2006
(Continued)

OTHER PUBLICATIONS

U.S. Appl. No. 16/500,090, Non-Final Office Action, dated Oct. 28, 2021, 8 pages.
(Continued)

*Primary Examiner* — Jeffrey M Wollschlager
(74) *Attorney, Agent, or Firm* — Kilpatrick Townsend & Stockton LLP

(57) ABSTRACT

Provided is a molding apparatus used for manufacturing a molded surface fastener wherein a die wheel driving rotationally has a concentric double cylinder structure provided with an outer side cylindrical body that has provided therethrough a plurality of penetrating holes, and an inner side cylindrical body that has formed, in the outer peripheral surface thereof, a plurality of grooved portions, the grooved portions located in the inner side cylindrical body include a use grooved portion that intersects with the penetrating hole of the outer side cylindrical body and a non-use grooved portion that is covered by the inner peripheral surface of the outer side cylindrical body. By using this molding apparatus obtained is a molded surface fastener in which a plurality of types of engaging elements having different shapes in a plan view are arranged cyclically in a reference direction.

16 Claims, 21 Drawing Sheets

(51) Int. Cl.
  *B29C 33/42* (2006.01)
  *B29C 43/22* (2006.01)
  *B29C 43/46* (2006.01)
  *B29L 31/00* (2006.01)

(52) U.S. Cl.
  CPC ............ *B29C 33/42* (2013.01); *B29C 43/222* (2013.01); *B29C 43/46* (2013.01); *B29C 48/30* (2019.02); *B29C 2043/461* (2013.01); *B29L 2031/729* (2013.01)

(58) Field of Classification Search
  CPC ....... B29C 43/222; B29C 43/46; B29C 48/30; B29C 2043/461; B29C 48/13; B29C 48/35; B29C 48/08; B29L 2031/729
  USPC .................................................. 428/99, 100
  See application file for complete search history.

(56) References Cited

U.S. PATENT DOCUMENTS

| | | | |
|---|---|---|---|
| 6,061,881 | A | 5/2000 | Takizawa et al. |
| 6,287,665 | B1 | 9/2001 | Hammer |
| 6,627,133 | B1 | 9/2003 | Tuma |
| 7,008,589 | B1 | 3/2006 | Poulakis |
| 8,961,850 | B2 | 2/2015 | Wood et al. |
| 9,357,815 | B2 | 6/2016 | Minato et al. |
| 2002/0053119 | A1 | 5/2002 | Provost et al. |
| 2002/0069495 | A1 | 6/2002 | Murasaki |
| 2002/0116799 | A1 | 8/2002 | Martin et al. |
| 2002/0162197 | A1 | 11/2002 | Romanko et al. |
| 2006/0200951 | A1 | 9/2006 | Provost et al. |
| 2007/0238835 | A1 | 10/2007 | Chen |
| 2008/0050553 | A1 | 2/2008 | Tuma |
| 2013/0067702 | A1 | 3/2013 | Tuma |
| 2014/0053377 | A1 | 2/2014 | Poulakis |
| 2015/0074956 | A1 | 3/2015 | Marche et al. |
| 2016/0135551 | A1 | 5/2016 | Poulakis |
| 2017/0119107 | A1 | 5/2017 | Okuda et al. |
| 2018/0360170 | A1 | 12/2018 | Fukuhara et al. |

FOREIGN PATENT DOCUMENTS

| | | |
|---|---|---|
| CN | 102984965 A | 3/2013 |
| CN | 103562570 A | 2/2014 |
| CN | 203609585 U | 5/2014 |
| CN | 104144665 A | 11/2014 |
| EP | 0799125 B1 | 6/1999 |
| JP | H08-183108 A | 7/1996 |
| JP | 2001-507643 A | 6/2001 |
| JP | 2002-519078 A | 7/2002 |
| JP | 2002-537045 A | 11/2002 |
| JP | 2004-057350 A | 2/2004 |
| WO | 2000/00053 A1 | 1/2000 |
| WO | 2016/002049 A1 | 1/2016 |

OTHER PUBLICATIONS

U.S. Appl. No. 16/500,090, Non-Final Office Action, dated Apr. 27, 2021, 6 pages.
Office Action, Taiwanese Patent Application No. 106128726, dated Nov. 7, 2018, 13 pages.
Decision of Refusal, Taiwanese Patent Application No. 106128726, dated Jun. 21, 2019, 5 pages.
Decision to Grant a Patent, Taiwanese Patent Application No. 106128726, dated Oct. 26, 2020, 6 pages.
International Search Report, PCT Application No. PCT/JP2017/013985, dated Jun. 13, 2017.
Restriction Requirement, U.S. Appl. No. 16/500,090, dated Dec. 7, 2020.
Office Action, Chinese Patent Application No. 201780089285.2, dated Jul. 8, 2021, 15 pages.
Office Action, German Patent Application No. 11 2017 007 389.8, dated Jan. 9, 2023, 13 pages.
U.S. Appl. No. 16/500,090, Notice of Allowance, dated Jan. 31, 2022, 7 pages.

MOLDING APPARATUS AND MANUFACTURING METHOD FOR MOLDED SURFACE FASTENER

This application is a divisional of U.S. patent application Ser. No. 16/500,090, which is incorporated by reference herein in its entirety.

TECHNICAL FIELD

The invention relates to a molding apparatus used for manufacturing a molded surface fastener, a manufacturing method for manufacturing the molded surface fastener using the molding apparatus and a molded surface fastener manufactured using the molding apparatus.

BACKGROUND ART

Conventionally, surface fastener products used by combining a female surface fastener having a plurality of loops and a male molded surface fastener capable of engaging and disengaging with the female surface fastener as a pair are known. Generally, a male molded surface fastener manufactured by molding synthetic resin is formed such that a plurality of male engaging elements having a mushroom shape and the like stand on an upper surface of a plate-shaped base portion. The mushroom-shaped engaging element generally has a stem portion standing up from the base portion and having a column shape and an engaging head portion bulging outward from an outer periphery part of an upper end of the stem portion.

Presently, surface fastener products having such a male surface fastener are widely used in a various kinds of goods. For example, it is often used for goods to be put on and taken off from a body such as a disposable diaper, a diaper cover for babies and infants, a supporter protecting joints of arms and legs, a corset for waist (belt for backache) and gloves.

In a conventional male molded surface fastener having a mushroom-shaped engaging element, for example, a plurality of the engaging elements standing on one base portion are formed in the same shape. Since the plurality of the engaging elements have the same shape, an appropriate engaging strength (or peeling strength) to a predetermined female surface fastener can be stably obtained.

A manufacturing method and a manufacturing apparatus for manufacturing a surface fastener having such a plurality of mushroom-shaped male engaging elements are disclosed in WO 2000/000053A1 (Patent Document 1: corresponding to JP2002-519078 A) and the like.

For example, in the manufacturing method described in Patent Document 1, firstly, a primary molding step for molding a primary molded body 110 having a flat plate-shaped base portion, a stem portion standing on the base portion and a primary head portion formed integrally on the stem portion is conducted, as shown in FIG. 39. Thereafter, a secondary molding step for extending the primary head portion flatly in a radial direction by making the primary molded body 110 pass through a calender and pressing the primary head portion of the primary molded body 110 to mold an engaging head portion is conducted.

In this case, a molding apparatus 111 for the above-mentioned primary molding has a rotating molding cylinder 112, a press cylinder 113 disposed opposing to the molding cylinder 112 with a predetermined interval and an extrusion head 114 supplying a molten thermoplastic resin between the molding cylinder 112 and the press cylinder 113.

Further, the molding cylinder 112 in Patent Document 1 has a cylinder-shaped outside screen (also referred to as an outer side cylindrical body) 115 and a cylinder-shaped inside screen (also referred to as an inner side cylindrical body) 116 contacting with an inner peripheral surface of the outside screen 115 as shown in FIGS. 40 and 41.

A plurality of column-shaped hollows 117 molding the stem portions are formed on the outside screen 115 of the molding cylinder 112. A plurality of column-shaped hollows 118 molding the primary head portions are formed on the inside screen 116. Each hollow 117 on the outside screen 115 and each hollow 118 on the inside screen 116 are disposed aligning at a position corresponding to each other.

By using the molding apparatus 111 having such a molding cylinder 112, the thermoplastic resin material is supplied from the extrusion head 114 between the molding cylinder 112 and the press cylinder 113 while the molding cylinder 112 and the press cylinder 113 are rotated, thereby the primary molded body 110 in which a plurality of engaging elements each having a stem portion and a primary head portion on which a depression is formed stand on the base portion is molded.

Thereafter, the obtained primary molded body 110 is passed through the calender and each primary head portion is made to be thin, thereby the molded surface fastener of Patent Document 1 in which a plurality of mushroom-shaped engaging elements having the same shape stand on the base portion is manufactured. In the molded surface fastener manufactured in Patent Document 1, a grooved portion is formed on a center part of an upper surface on the engaging head portion of each engaging element, and each engaging element has the same shape.

PRIOR ART DOCUMENTS

Patent Documents

Patent Document 1: WO 2000/000053 A1

SUMMARY OF INVENTION

Problem to be Solved by the Invention

When a molded surface fastener is manufactured by the manufacturing method of the above-mentioned Patent Document 1, the molding cylinder 112 having the outside screen 115 on which a plurality of cylinder-shaped hollows 117 are formed and the inside screen 116 on which a plurality of column-shaped hollows 118 are formed is used. In this case, for forming respective engaging elements disposed on the molded surface fastener to be the same predetermined shape, it is required that each hollow 117 of the outside screen 115 and each hollow 118 of the inside screen 116 in the molding cylinder 112 are formed at predetermined positions precisely to correspond to each other.

However, when the outside screen 115 and the inside screen 116 as in Patent Document 1 are formed, each of the outside screen 15 and the inside screen 116 are separately produced. In this case, an error tends to occur in a position of the hollow 117 provided on the outside screen 115 and in a position of the hollow 118 provided on the inside screen 116 respectively, and it is difficult to adjust all the positions of the hollows 117 of the outside screen 115 and all the positions of the hollows 118 of the inside screen 116 without fail. Therefore, the positions of the hollows 117 of the outside screen 115 and the positions of the hollows 118 of the inside screen 116 tends to be relatively displaced.

Therefore, a part of the molded engaging elements may have a shape disable to engage with a loop, or an undercut may be formed between the outside screen 115 and the inside screen 116, and the engaging element may be damaged when an engaging element is forcibly peeled off from the hollows 118, 117 of the inside and outside screens 116, 115, thereby all the engaging elements are not formed in a predetermined constant shape. As a result, the engaging strength (or peeling strength) of the manufactured molded surface fastener may be lowered, or the molded surface fastener may be treated as a defective product, which leads to a lowered yield. Further, it is also considered that when the molding die such as the outside screen 115 and the inside screen 116 is reproduced, the produced molding die is required to show high reproducibility, or it becomes difficult to control a shape of the engaging elements.

On the other hand, in order to form all the hollows 117 of the outside screen 115 at predetermined positions and form all the hollows 118 of the inside screen 116 at predetermined positions, it is considered to significantly enhance a processing accuracy at the time of processing the outside screen 115 and the inside screen 116. However, it requires a cost to improve the processing accuracy of the outside screen 115 and the inside screen 116, which leads to an increased manufacturing cost with the increased processing accuracy.

Generally, for a male surface fastener, an engaging rate and a peeling strength of loops of a non-woven fabric as a female surface fastener are tend to change depending of its structure, and performance of the male surface fastener may be changed depending on a combination with the non-woven fabric in some cases. Therefore, when the male molded surface fastener is used for a product such as a disposable diaper and a protective supporter, it is required that an appropriate male surface fastener is selected in view of a combination with a female surface fastener used in the product.

In this case, however, a use purpose of the male surface fastener is restricted, or a cost of the final product is increased in some cases. Therefore, it has been conventionally required to develop a male surface fastener which can stably exert an appropriate engaging strength and the like to the various kinds of female surface fasteners.

The present invention was made in light of the above-mentioned conventional problems. Its specific objective is to provide a molding apparatus used for molding a molded surface fastener and having a die wheel of a double cylinder structure provided with an outer side cylindrical body and an inner side cylindrical body, the molding apparatus capable of manufacturing the molded surface fastener stably exerting an appropriate performance to the various kinds of female molded surface fasteners without heavily depending on a processing accuracy of the outer side cylindrical body and the inner side cylindrical body, and a manufacturing method for manufacturing the molded surface fastener using the molding apparatus. Another objective is to provide the molded surface fastener capable of stably exerting an appropriate performance to various kinds of female surface fasteners without heavily depending on the processing accuracy of the outer side cylindrical body and the inner side cylindrical body.

Means for Solving the Problem

To achieve the above objective, the molding apparatus provided by the present invention has, as a basic structure, a die wheel driving rotationally in one direction and an extrusion nozzle discharging a molten synthetic resin material toward the die wheel, and is used for manufacturing a synthetic resin molded surface fastener on which a plurality of engaging elements stand on an upper surface of a base portion, in which the die wheel has a concentric double cylinder structure provided with an outer side cylindrical body and an inner side cylindrical body disposed in close contact with an inner peripheral surface of the outer side cylindrical body, a plurality of penetrating holes penetrating the outer side cylindrical body from an outer peripheral surface to the inner peripheral surface are provided, a plurality of grooved portions are grooved on an outer peripheral surface of the inner side cylindrical body, more grooved portions of the inner side cylindrical body are provided than the penetrating holes of the outer side cylindrical body in a certain region in a reference direction, when at least one direction is determined as the reference direction, an outer peripheral edge of each penetrating hole on the inner peripheral surface of the outer side cylindrical body has a part overlapping the grooved portion of the inner side cylindrical body and a part in close contact with the outer peripheral surface of the inner side cylindrical body, and the grooved portions disposed on the inner side cylindrical body include a use grooved portion disposed intersecting with the penetrating holes on the outer side cylindrical body and to which the molten synthetic resin material can be flowed and a non-use grooved portion disposed between the penetrating holes adjacent to each other in the outer side cylindrical body and covered by the inner peripheral surface of the outer side cylindrical body.

In such a molding apparatus of the present invention, it is preferable that a plurality of the penetrating holes are provided on the outer side cylindrical body to have a constant penetrating hole pitch in the reference direction, a plurality of the grooved portions are provided on the inner cylindrical body to have a constant grooved portion pitch in the reference direction, and a size of the grooved portion pitch is smaller than a size of the penetrating hole pitch.

In the molding apparatus of the present invention, it is preferable that, as the penetrating holes disposed in the reference direction of the outer side cylindrical body, at least two kinds of the penetrating holes having different position relations of the use grooved portions with respect to the penetrating holes are included, and the same kind of the penetrating holes having the same position relation of the use grooved portions with respect to the penetrating holes are disposed at a constant cycle along the reference direction.

In the molding apparatus of the present invention, it is also preferable that the penetrating holes of the outer side cylindrical body and the grooved portions of the inner side cylindrical body are disposed so that the least common multiple between the size of the penetrating hole pitch and the size of the grooved portion pitch is larger than the size of the penetrating hole pitch.

In this case, it is preferable that a value calculated by dividing the least common multiple by the size of the penetrating hole pitch is less than 40.

In the molding apparatus of the present invention, it is preferable that the size of the grooved portion pitch is smaller than the size in the reference direction of the penetrating hole of the outer side cylindrical body.

Further in the molding apparatus of the present invention, it is preferable that the penetrating holes disposed adjacent to each other in the reference direction are provided to have different position relations of the use grooved portions with respect to the penetrating holes from each other.

Particularly, it is preferable that the reference direction is a machine direction of the die wheel.

Next, a manufacturing method of a molded surface fastener provided by the present invention is, as a basic structure, the manufacturing method of a synthetic resin molded surface fastener in which a plurality of engaging elements stand on an upper surface of a base portion by molding using a molding apparatus having a die wheel driving rotationally in one direction and an extrusion nozzle discharging a molten synthetic resin material toward the die wheel, in which the die wheel has a concentric double cylinder structure provided with an outer side cylindrical body and an inner side cylindrical body disposed in close contact with an inner peripheral surface of the outer side cylindrical body, in which, the method includes using the die wheel in which a plurality of penetrating holes penetrating from an outer peripheral surface to the inner peripheral surface are provided, a plurality of grooved portions are grooved on an outer peripheral surface of the inner side cylindrical body, more grooved portions of the inner side cylindrical body are provided than the penetrating holes of the outer side cylindrical body in a certain region in a reference direction when at least one direction is defined as the reference direction, an outer peripheral edge of each penetrating hole on the inner peripheral surface of the outer side cylindrical body has a part overlapping the grooved portion of the inner side cylindrical body and a part in close contact with the outer peripheral surface of the inner side cylindrical body, and the grooved portions disposed in the inner side cylindrical body, a use grooved portions disposed to intersect with the penetrating holes on the outer side cylindrical body and to which the molten synthetic resin material can be flowed, and a non-use grooved portion disposed between the penetrating holes adjacent to each other on the outer side cylindrical body and covered by the inner peripheral surface of the outer side cylindrical body.

A manufacturing method of a molded surface fastener according to another embodiment provided by the present invention is the manufacturing method for manufacturing the molded surface fastener by conducting a primary molding step of molding a primary molded body on which a plurality of provisional engaging elements stand on an upper surface of a base portion using a molding apparatus having a die wheel driving rotationally in one direction and an extrusion nozzle discharging a molten synthetic resin material toward the die wheel, in which the die wheel has a concentric double cylinder structure provided with an outer side cylindrical body and an inner side cylindrical body disposed in close contact with an inner peripheral surface of the outer side cylindrical body, and a secondary molding step of heating a part of each provisional element of the primary molded body and compressing it from above at the same time, in which, the method includes using the die wheel in which a plurality of penetrating holes penetrating from an outer peripheral surface to the inner peripheral surface are provided, a plurality of grooved portions are grooved on an outer peripheral surface of the inner side cylindrical body, more grooved portions of the inner side cylindrical body are provided than the penetrating holes of the outer side cylindrical body in a certain region in a reference direction when at least one direction is defined as the reference direction, an outer peripheral edge of each penetrating hole on the inner peripheral surface of the outer side cylindrical body has a part overlapping the grooved portion of the inner side cylindrical body and a part in close contact with the outer peripheral surface of the inner side cylindrical body, and the grooved portions disposed in the inner side cylindrical body, a use grooved portions disposed to intersect with the penetrating holes on the outer side cylindrical body and to which the molten synthetic resin material can be flowed, and a non-use grooved portion disposed between the penetrating holes adjacent to each other on the outer side cylindrical body and covered by the inner peripheral surface of the outer side cylindrical body.

In such a manufacturing method of the molded surface fastener as above according to the present invention, it is preferable that the method includes using the die wheel that a plurality of the penetrating holes are provided on the outer side cylindrical body to have a constant penetrating hole pitch in the reference direction, a plurality of the grooved portions are provided on the inner side cylindrical body to have a constant grooved portion pitch in the reference direction, and a size of the grooved portion pitch is smaller than a size of the penetrating hole pitch.

In the manufacturing method of the molded surface fastener according to the present invention, it is preferable that the method includes using the die wheel that, as the penetrating holes disposed in the reference direction of the outer side cylindrical body, at least two kinds of the penetrating holes having different position relations of the use grooved portions with respect to the penetrating holes are included, and the same kind of the penetrating holes having the same position relation of the use grooved portions with respect to the penetrating holes are disposed at a constant cycle along the reference direction.

In the manufacturing method of the molded surface fastener according to the present invention, it is also preferable that the method includes using the die wheel that penetrating holes of the outer side cylindrical body and the grooved portions of the inner side cylindrical body are disposed so that the least common multiple of the size of the penetrating hole pitch and the size of the grooved portion pitch is larger than the size of the penetrating hole pitch.

Next, a molded surface fastener provided by the present invention is a synthetic resin molded surface fastener including a flat plate-shaped base portion and a plurality of engaging elements standing on an upper surface of the base portion, in which, when at least one direction is determined as a reference direction, the engaging elements are disposed to have constant pitches along the reference direction, each engaging element has a stem portion standing up from the upper surface of the base portion and at least one pawl portion protruded outward from an upper end outer peripheral edge of the stem portion in a plan view of the engaging element or an extended portion extending outward from the outer peripheral edge of the upper end of the stem portion outward in the plan view, a plurality of the engaging elements disposed along the reference direction include at least two kinds of the engaging elements having different shapes from each other in the plan view of the engaging element, and the same kind of the engaging elements having the same shape in the plan view of the engaging element are disposed along the reference direction at constant cycles.

Further, a molded surface fastener according to another embodiment provided by the present invention is a synthetic resin molded surface fastener including a flat plate-shaped base portion and a plurality of engaging elements standing on an upper surface of the base portion, in which the engaging elements are, when at least one direction is determined as a reference direction, disposed along the reference direction to have constant pitches, each engaging element has a stem portion standing up from the base portion, an engaging head portion bulging outward from an upper end outer peripheral part of the stem portion and formed integrally with the stem portion, and at least one pawl portion protruded outward from an outer peripheral edge part of the engaging head portion or an extended portion extending outward from the outer peripheral edge of the engaging head portion, a plurality of the engaging elements disposed along the reference direction include at least two kinds of the engaging elements having different shapes from each other in a plan view of the engaging elements, and the same kind of the engaging elements having the same shape in the plan view of the engaging element are disposed along the reference direction at a constant cycle.

In the molded surface fastener as above according to the present invention, it is preferable that in the constant cycles in the reference direction, at least one engaging element having the pawl portion is disposed.

In the molded surface fastener according to the present invention, it is preferable that the number of the engaging elements forming the cycle in the reference direction is less than 40.

Further, in the molded surface fastener according to the present invention, it is preferable that, in at least a part of the engaging elements, the engaging elements adjacent in the reference direction are formed to have different shapes in a plan view of the engaging elements.

Further in a plan view of the engaging element in the present invention, it is preferable that when each engaging element is viewed separately to a first end part area including an end part on one side in the reference direction, a center area including a center part of the reference direction and a second end part area including an end part on the other side in the reference direction; the engaging element has a first shape element in which two pawl portions are disposed in the center area per one engaging element, a second shape element in which two pawl portions are disposed at the first end part area or the second end part area per one engaging element, and a third shape element in which four pawl portions are disposed or the extended portion is disposed per one engaging element; and in each cycle, the first shape element, the second shape element and the third shape element are disposed at a predetermined placement pattern.

In the molded surface fastener according to the present invention, it is preferable that a shape of the engaging element in a plan view is changed step by step along the reference direction.

Further, it is preferable that the reference direction is a length direction of the base portion.

Furthermore, in the molded surface fastener according to the present invention, it is preferable that the same kind of the engaging elements having the same shape in a plan view of the engaging element are disposed along a direction perpendicular to the reference direction.

Effects of the Invention

The molding apparatus used for manufacturing the molded surface fastener according to the present invention has a die wheel driving rotationally in one direction and an extrusion nozzle supplying a molten synthetic resin material. The die wheel is provided with an outer side cylindrical body and an inner side cylindrical body disposed in close contact with an inner peripheral surface of the outer side cylindrical body, and has a concentric double cylinder structure.

The outer side cylindrical body of the die wheel has a plurality of penetrating holes penetrating the outer side cylindrical body from an outer peripheral surface to the inner peripheral surface. The inner side cylindrical body of the die wheel has a plurality of grooved portions grooved on the outer peripheral surface of the inner side cylindrical body. The grooved portion provided in the inner side cylindrical body of the present invention includes a grooved channel portion grooved in a straight line shape or a curved line shape on the outer peripheral surface of the inner side cylindrical body, and a depressed portion grooved on the outer peripheral surface of the inner side cylindrical body with a certain region (shape). Further in the present invention, an outer peripheral edge of each penetrating hole in the inner peripheral surface of the outer side cylindrical body has a part overlapping the grooved portion of the inner side cylindrical body and a part in close contact with the outer peripheral surface of the inner side cylindrical body.

Further, the grooved portions disposed on the outer peripheral surface of the inner side cylindrical body include a use grooved portion disposed to be expressed on the penetrating hole in the outer side cylindrical body and to which the molten synthetic resin material can be flowed, and a non-use grooved portion disposed in an area between the penetrating holes adjacent to each other in the reference direction of the outer side cylindrical body and covered by the inner peripheral surface of the outer side cylindrical body.

By using the above-mentioned molding apparatus of the present invention, the molded surface fastener in which a plurality of the engaging elements stand on the upper surface of the plate-shaped base portion, and each engaging element has the stem portion formed by using the penetrating hole of the outer side cylindrical body and at least one pawl portion formed by using the grooved portion of the inner side cylindrical body can be smoothly manufactured.

Particularly in the molding apparatus of the present invention, at least one use grooved portion disposed to be expressed on the penetrating hole of the outer side cylindrical body and at least one non-use grooved portion forbidding inflow of the molten synthetic resin material at the time of molding are intentionally formed as a grooved portion disposed along the reference direction on the inner side cylindrical body.

That is, in the molding apparatus of the present invention, the penetrating holes provided on the outer side cylindrical body and the grooved portions provided on the inner side cylindrical body are not provided to correspond to each other in the reference direction, but the number of grooved portions provided on the inner side cylindrical body is intentionally increased more than the number of the penetrating holes provided on the outer side cylindrical body, and the non-use grooved portions as above are positively provided. Thereby, even when an error occurs in the positions of the penetrating holes provided on the outer side cylindrical body and in the positions of the grooved portions provided on the inner side cylindrical body, at least one grooved portion of the inner side cylindrical body is provided to intersect with each penetrating hole of the outer side cylindrical body without fail. Therefore, the molded surface fastener in which each engaging element has at least one pawl portion can be stably manufactured.

Further, in the molding apparatus of the present invention, the penetrating holes provided on the outer side cylindrical body and the grooved portions provided on the inner side cylindrical body are intentionally formed not to correspond to one to one. Thereby, as a plurality of engaging elements disposed along the reference direction of the molded surface fastener to be manufactured, not only one kind of engaging elements having a predetermined constant shape (form) but also two or more kinds of engaging elements having different shapes (specifically shapes having different position relations of the pawl portions in a plan view of the engaging element) can be formed.

As the engaging element disposed in the reference direction of the molded surface fastener as above, two or more kinds of engaging elements having different shapes are intentionally formed. Thereby, even when an error (displacement) occurs in the positions of the penetrating holes of the outer side cylindrical body and the positions of the grooved portions of the inner side cylindrical body due to the processing accuracy of the outer side cylindrical body and the inner side cylindrical body, an influence of the error to the engaging strength (peeling strength) of the molded surface fastener can be suppressed. As a result, the molded surface fastener stably provided with an appropriate engaging strength (peeling strength) can be manufactured. Further, lowering of yield of the molded surface fasteners can be suppressed, and productivity can be improved.

In addition, in the molded surface fastener having two or more kinds of engaging elements to be manufactured using the molding apparatus of the present invention as mentioned above, strength and weakness of each engaging element can be complemented each other between the engaging elements having different shapes. Thereby, performance of the molded surface fastener to be manufactured can be less affected by a type of non-woven fabric (female surface fastener). That is, by using the molding apparatus of the present invention, the molded surface fastener stably provided with an appropriate fastener performance such as engaging strength can be provided.

In the molding apparatus of the present invention as above, a plurality of penetrating holes are provided on the outer side cylindrical body to have constant penetrating hole pitches in the reference direction. In the inner side cylindrical body, a plurality of grooved portions are provided to have constant grooved portion pitches in the reference direction. Further, a size of the grooved portion pitch of the inner side cylindrical body is smaller than a size of the penetrating hole pitch of the outer side cylindrical body. Thereby, the use grooved portions and the non-use grooved portions are intentionally provided stably, and the penetrating holes provided on the outer side cylindrical body and the grooved portions provided on the inner side cylindrical body are stably formed intentionally not to correspond to one to one. As a result, the molded surface fastener in which two or more kinds of engaging elements having different shapes of the engaging elements and different position relations of the pawl portions from each other in a plan view when the engaging element is viewed from above are intentionally provided, and the same kind of engaging elements having the same shape of the engaging elements and the same position relations of the pawl portions are provided along the reference direction cyclically can be stably manufactured.

In the molding apparatus of the present invention, the penetrating holes disposed in the reference direction of the outer side cylindrical body include at least two kinds of penetrating holes having different position relations of the use grooved portions with respect to the penetrating holes from each other. Further, the same kind of penetrating holes having the same position relation of the use grooved portions with respect to the penetrating holes are disposed along the reference direction at constant cycles.

Thereby, the molded surface fastener in which two or more kinds of engaging elements having different position relations of the pawl portions from each other are disposed along the reference direction, and the same kind of engaging elements having the same position relation of the pawl portions are disposed cyclically along the reference direction can be stably manufactured. As a result, an influence of the processing accuracy of the outer side cylindrical body and the inner side cylindrical body to the performance of the molded surface fastener can be suppressed. Further, the molded surface fastener that the fastener performance is less affected by a type of non-woven fabric can be manufactured. In the present invention, the position relation of the pawl portion means a relative placement of the pawl portions with respect to the stem portion or the engaging head portion in a plan view of the engaging element when the engaging element having at least one pawl portion at the stem portion or the engaging head portion is viewed from above.

In the molding apparatus of the present invention, the penetrating hole of the outer side cylindrical body and the grooved portion of the inner side cylindrical body are disposed so that the least common multiple between the size of the penetrating hole pitch and the size of the grooved portion pitch is larger than the size of the penetrating hole pitch. In this case, the value obtained by dividing the above least common multiple by the size of the penetrating hole pitch is an integer (natural number), and the value represents the number of the penetrating holes (size of the cycle) provided in one cycle in a case that the same kind of penetrating holes are cyclically disposed in the reference direction.

Since the least common multiple as above is larger than the size of the penetrating hole pitch, even when an error occurs between a position of the penetrating hole of the outer side cylindrical body and a position of the grooved portion of the inner side cylindrical body due to the processing accuracy of the outer side cylindrical body and the inner side cylindrical body, the error can be made to be small to a degree that the influence of the error to the cyclicity of the penetrating holes can be ignored. Thereby, a molded surface fastener provided with the cyclicity to the shape of the engaging elements along the reference direction can be stably manufactured.

In this case, the value calculated by dividing the least common multiple by the size of the penetrating hole pitch (i.e. the cycle that the same kind of penetrating holes are disposed) is less than 40, preferably 20 or less, and particularly preferably 15 or less. Thereby, the molded surface fastener stably provided with an appropriate engaging strength and having the fastener performance less likely to be affected by the type of non-woven fabric can be stably manufactured.

In the molding apparatus of the present invention, the size of the grooved portion pitch as mentioned above is smaller than a size of the penetrating hole of the outer side cylindrical body in the reference direction. Thereby, the molded surface fastener in which each engaging element has at least one pawl portion can be more stably manufactured.

Further in the molding apparatus of the present invention, the penetrating holes disposed adjacent to each other in the reference direction are provided to have position relations of the use grooved portions different from each other with respect to the penetrating holes. Thereby, in at least a part of the molded surface fastener to be manufactured, the position relations of the pawl portions of the engaging elements adjacent to each other in the reference direction can be different without fail, and the molded surface fastener having at least two kinds of engaging elements in the reference direction can be stably manufactured.

Particularly, the above-mentioned reference direction is a machine direction of the die wheel, thereby the molded surface fastener having at least two kinds of engaging elements in the length direction of the base portion (machine direction) can be stably manufactured.

Next, in the manufacturing method of the molded surface fastener according to the present invention, the molded surface fastener is manufactured, molding the molded surface fastener on which a plurality of engaging elements stand on an upper surface of the base portion by using the molding apparatus having a die wheel and an extrusion nozzle of the present invention as above. That is, the die wheel of the molding apparatus is formed such that, in a certain region in the reference direction, more grooved portions of the inner side cylindrical body are provided than penetrating holes of the outer side cylindrical body, and the grooved portions of the inner side cylindrical body include use grooved portions in which synthetic resin material can be flowed and non-use grooved portions covered by the outer side cylindrical body.

According to the manufacturing method of the present invention, the molded surface fastener on which a plurality of the engaging elements stand on the upper surface of the plate-shaped base portion, and each engaging element has a stem portion formed by using a penetrating hole of the outer side cylindrical body and at least one pawl portion formed by using the grooved portions of the inner side cylindrical body can be smoothly and stably manufactured.

Also in the manufacturing method of the present invention, a molded surface fastener having two or more kinds of engaging elements having different position relations of pawl portions along the reference direction in a plan view of the engaging elements can be manufactured. Thereby, as mentioned above, the influence of the processing accuracy of the outer side cylindrical body and the inner side cylindrical body to the engaging strength of the molded surface fastener can be suppressed. Further, the performance of the molded surface fastener to be manufactured can be less affected by a type of the non-woven fabric.

Next, in a manufacturing method of another embodiment of the present invention, a molded surface fastener is manufactured by conducting a primary molding step of molding a primary molded body using the above-mentioned molding apparatus of the present invention having a die wheel and an extrusion nozzle, and a secondary molding step of heating a part of a provisional element of the obtained primary molded body and compressing it from above. That is, the die wheel of the molding apparatus is formed so that more grooved portions of the inner side cylindrical body are provided than the penetrating holes of the outer side cylindrical body in a certain region in the reference direction, and the grooved portions of the inner side cylindrical body include a use grooved portion in which synthetic resin material can be flowed, and a non-use grooved portion covered by the outer side cylindrical body.

Also by such a manufacturing method of the present invention, the molded surface fastener on which a plurality of engaging elements stand on an upper surface of a plate-shaped base portion, and each engaging element has a stem portion formed by using the penetrating hole of the outer side cylindrical body and at least one pawl portion formed by using the grooved portion of the inner side cylindrical body can be smoothly and stably manufactured.

In the manufacturing method of the present invention, it is also possible to manufacture a molded surface fastener having two or more kinds of engaging elements having different position relations of the pawl portions along the reference direction in a plan view of the engaging element. Thereby, as mentioned above, the influence of the processing accuracy of the outer side cylindrical body and the inner side cylindrical body to the engaging strength of the molded surface fastener can be suppressed. Further, the performance of the molded surface fastener to be manufactured can be less affected by a type of the non-woven fabric.

In the manufacturing method of the molded surface fastener of the present invention as above, a die wheel of the molding apparatus on which a plurality of penetrating holes are provided on the outer side cylindrical body to have constant penetrating hole pitches in the reference direction, a plurality of grooved portions are provided on the inner side cylindrical body to have constant grooved portion pitches in the reference direction, and a size of the grooved portion pitch is smaller than a size of the penetrating hole pitch is used. Thereby, the molded surface fastener on which two or more kinds of engaging elements having different shapes of the engaging elements and different position relations of the pawl portions from each other in a plan view of the engaging element from above are disposed along the reference direction, and the same kind of engaging elements having the same shape of the engaging elements and the same position relation of the pawl portions are cyclically disposed along the reference direction can be stably manufactured.

In the manufacturing method of the present invention, a die wheel of the molding apparatus on which the penetrating holes disposed in the reference direction of the outer side cylindrical body include at least two kinds of penetrating holes having different position relations of the use grooved portion with respect to the penetrating hole from each other, and the same kind of penetrating holes having the same position relation of the use grooved portions with respect to the penetrating hole are disposed along the reference direction at constant cycles is used. Thereby, the molded surface fastener on which two or more kinds of engaging elements are disposed in the reference direction and the same kind of engaging elements are cyclically disposed along the reference direction can be stably manufactured.

Further, in the manufacturing method of the molded surface fastener according to the present invention, the die wheel in which the penetrating holes of the outer side cylindrical body and the grooved portions of the inner side cylindrical body are disposed so that the least common multiple between a size of the penetrating hole pitch and a size of the grooved portion pitch is larger than the size of the penetrating hole pitch is used. Thereby, the molded surface fastener provided with cyclicity in the shapes of the engaging elements along the reference direction can be stably manufactured.

Next, in a molded surface fastener provided by the present invention, engaging elements are disposed to have constant pitches along the reference direction. Further, each engaging element has a stem portion standing up from the upper surface of the base portion and at least one pawl portion protruded outward at a tip end part of the engaging element or an extended portion extending outward from the whole outer periphery of the tip end part of the engaging element. Further, a plurality of the engaging elements disposed along the reference direction include at least two kinds of engaging elements having different shapes from each other in a plan view of the engaging elements. Also, the same kind of engaging elements having the same shape in a plan view of the engaging element are disposed at constant cycles along the reference direction. In the present invention, having different shapes in a plan view of the engaging element includes a case having different shapes that the position relations of the pawl portions with respect to the stem portion are different from each other, and a case having different shapes depending on which the pawl portion or the extended portion is provided on the tip end part of the stem portion.

Such a molded surface fastener of the present invention can suppress the influence of the processing accuracy of the outer side cylindrical body and the inner side cylindrical body in the molding apparatus to the engaging strength of the molded surface fastener, thereby the appropriate engaging strength to the non-woven fabric can be stably provided. Also performance of the molded surface fastener such as engaging strength can be less affected by a type of the non-woven fabric.

Next, in a molded surface fastener according to another embodiment of the present invention, engaging elements are disposed along the reference direction to have constant pitches. Each engaging element has a stem portion standing up from an upper surface of a base portion, an engaging head portion bulging outward from an outer peripheral part of an upper end of the stem portion, and at least one pawl portion protruded outward from an outer peripheral edge part of the engaging head portion or an extended portion extending outward from a whole outer periphery of the outer peripheral edge part of the engaging head portion. Further, a plurality of the engaging elements disposed along the reference direction include at least two kinds of engaging elements having different shapes (position relations of the pawl portions with respect to the stem portion, for example) from each other in a plan view of the engaging element. Also the same kind of engaging elements having the same shape in the plan view of the engaging element are disposed along the reference direction at constant cycles.

For such a molded surface fastener of the present invention, an influence of the processing accuracy of the outer side cylindrical body and the inner side cylindrical body in the molding apparatus to the performance of the molded surface fastener such as engaging strength can be suppressed. Therefore, an appropriate engaging strength with respect to a non-woven fabric can be stably provided. The performance of the molded surface fastener such as the engaging strength can also be less affected by a type of the non-woven fabric.

The molded surface fastener of the present invention includes the molded surface fastener manufactured by conducting a primary molding step of molding a primary molded body using the molding apparatus having a die wheel and an extrusion nozzle, and thereafter, conducting a secondary molding step to the obtained primary molded body. In some cases of such a molded surface fastener, the provisional element of the primary molded body is compressed from above under a predetermined condition in the secondary molding step, thereby the pawl portion protruded from the outer peripheral edge part of the engaging head portion is not formed from a provisional pawl portion of the provisional element, but, instead of the pawl portion, the engaging element having the extended portion formed such that the provisional pawl portion is compressed to be flattened with a part of a provisional stem portion is formed.

In the molded surface fastener of the present invention as mentioned above, at least one engaging element having at least one pawl portion is disposed in a constant cycle in the reference direction. Thereby, the molded surface fastener of the present invention can be provided with an appropriate engaging strength to the non-woven fabric.

In the molded surface fastener of the present invention, the number of the engaging elements forming a cycle in the reference direction is less than 40, preferably 20 or less, and particularly preferably 15 or less. Since the number of the engaging elements forming one cycle is small, even when the molded surface fastener of the present invention is cut into a predetermined small size, and the small cut piece is attached to a final product, for example, it is possible that the cut piece of the molded surface fastener is provided with the number of the engaging elements more than the number of one cycle in the reference direction. Thereby, an appropriate engaging strength can be stably secured in any cut pieces of the molded surface fastener. Also, two or more kinds of engaging elements are cyclically provided in any cut pieces of the molded surface fastener, thereby the fastener performance is less affected by a type of non-woven fabric.

Also in at least a part of the engaging elements of the molded surface fastener in the present invention, different kinds of engaging elements having different shapes in a plan view of the engaging element by having different position relations of the pawl portions as the engaging elements adjacent to each other in the reference direction. Thereby, a cut piece of the molded surface fastener having been cut in a predetermined size is easy to be provided with two or more kinds of engaging elements, and the fastener performance can be yet less affected by a type of the non-woven fabric.

Further in a plan view of the engaging element in the present invention, when each engaging element is viewed separately as a first end part area including an end part on one side of the reference direction, a center area including a center part in the reference direction, and a second end part area including an end part on the other side in the reference direction, the engaging element has a first shape element that two pawl portions are disposed on the center area with respect to one engaging element, a second shape element that two pawl portions are disposed on the first end part area or the second end part area with respect to one engaging element, and a third shape element that four pawl portions are disposed or an extended portion is disposed with respect to one engaging element. Also in this case, the first shape elements, the second shape elements and the third shape elements are disposed at a predetermined same placement pattern in each cycle of the molded surface fastener in the reference direction.

Since the engaging elements roughly classified into three kinds depending on the placement of the pawl portions are disposed at a predetermined placement pattern, the cyclic nature of the engaging elements in the molded surface fastener can be relatively easily judged. Also, as the three kinds of engaging elements as mentioned above are disposed at a predetermined placement pattern along the reference direction, the molded surface fastener of the present invention can be provided with an appropriate engaging strength stably with respect to the various kinds of non-woven fabrics. When the engaging elements are classified into three kinds of the first shape element, the second shape element and the third shape element, positions of the pawl portions in the reference direction mean the center position of the pawl portion in the reference direction. For example, in a case that the reference direction is the length direction of the base portion (machine direction), and the pawl portions of the engaging element are disposed to be along a width direction of the base portion (perpendicular direction), the engaging element in which the center position of the pawl portion in the length direction is disposed on the center area including the center part of the engaging element in the length direction (machine direction) is the first shape element.

The molded surface fastener of the present invention is formed by changing its shape (particularly a position relation of the pawl portions in the engaging element) in a plan view of the engaging element step by step along the reference direction. Also thereby, the molded surface fastener of the present invention can be provided with an appropriate engaging strength with respect to the various kinds of non-woven fabrics.

Further in the molded surface fastener of the present invention, since the reference direction as mentioned above is the length direction of the base portion (machine direction), the molded surface fastener of the present invention can have at least two kinds of the engaging elements stably in the length direction of the base portion.

Furthermore in the molded surface fastener according to the present invention, the same kind of engaging elements having the same shape in a plan view of the engaging element are disposed along a direction perpendicular to the reference direction. Since the same kind of the engaging elements are disposed in a direction perpendicular to the reference direction, the shapes of the engaging elements formed on the molded surface fastener can be controlled easily, and the die wheel of the molding apparatus used for manufacturing the molded surface fastener in the present invention can be formed easily.

DESCRIPTION OF EMBODIMENT

Hereinafter, preferred embodiments of the present invention are described in detail with Embodiments referring to drawings. It should be noted that the present invention is not limited thereto, and various changes can be made as long as they have a substantially same structure and same functional effects. For example, in the Embodiments below, a number, a disposing position and a forming density of engaging elements disposed on a base portion of a molded surface fastener is not limited in particular, and can be changed arbitrarily.

Embodiment 1

Figure 1:
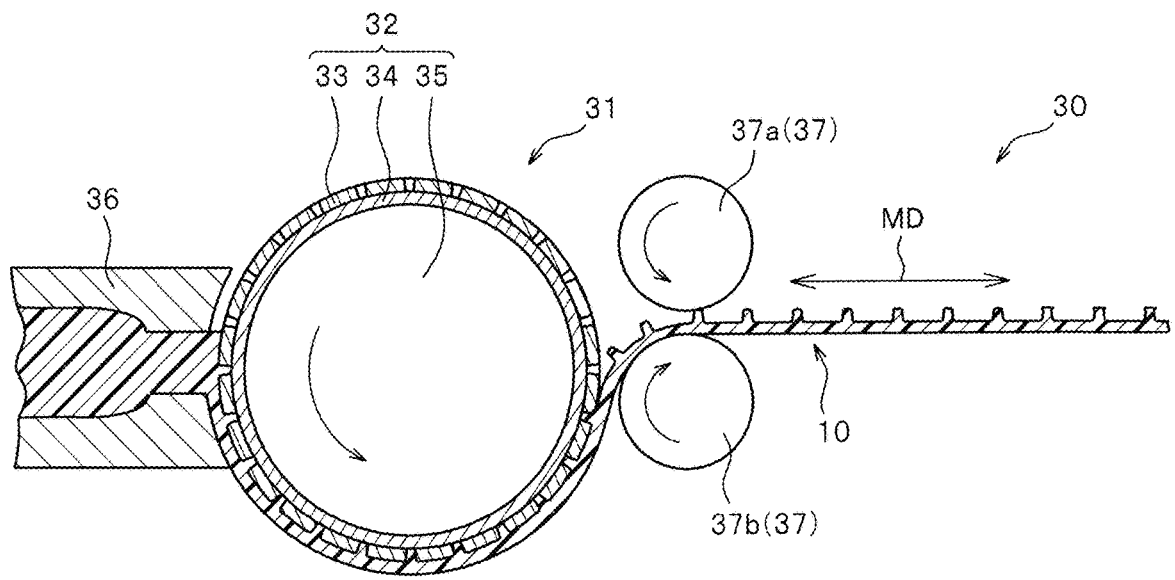
FIG. 1 is a schematic view illustrating schematically a manufacturing apparatus of a molded surface fastener according to Embodiment 1 of the present invention.
Figure 2:
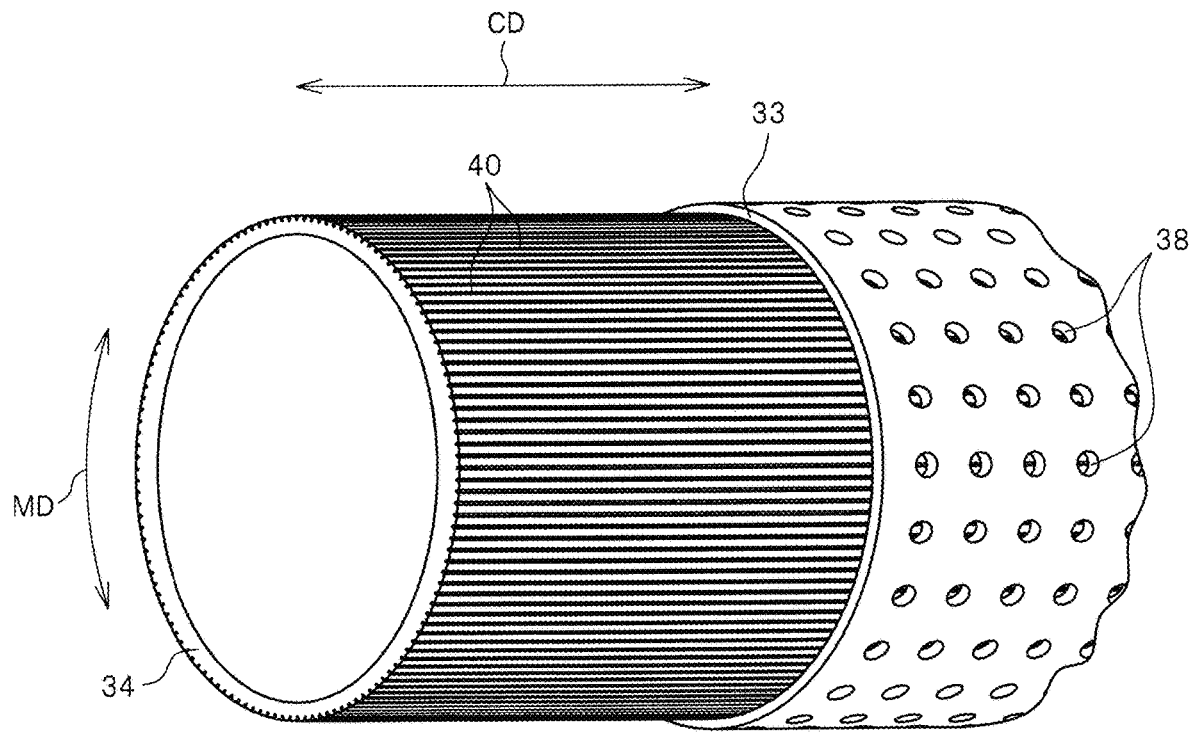
FIG. 2 is a perspective view illustrating schematically an outer side cylindrical body and an inner side cylindrical body disposed on the molding apparatus of the manufacturing apparatus.
Figure 3:
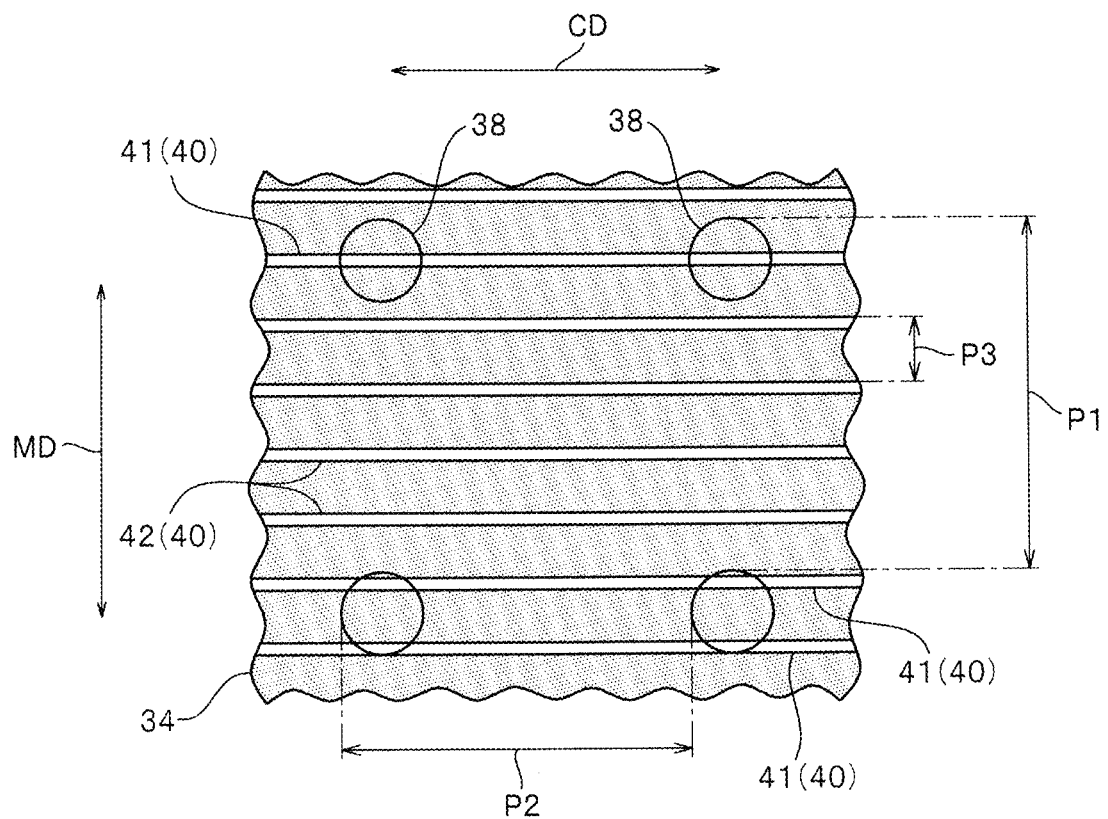
FIG. 3 is a main part schematic view illustrating position relations between penetrating holes formed on the outer side cylindrical body and grooved channel portions provided on the inner side cylindrical body.

FIG. 1 is a schematic view illustrating schematically a manufacturing apparatus of a molded surface fastener according to Embodiment 1 of the present invention. FIG. 2 is a perspective view illustrating schematically an outer side cylindrical body and an inner side cylindrical body disposed on the molding apparatus of the manufacturing apparatus. FIG. 3 is a main part schematic view illustrating position relations between penetrating holes formed on the outer side cylindrical body and grooved channel portions provided on the inner side cylindrical body. It should be noted that FIGS. 1 to 3 are outlined drawings illustrating schematically to easily understand the features of the present invention, and dimensions and the like of the shown apparatus may be different from the actual apparatus. Further, in the schematic view illustrating the position relation between the penetrating holes and the grooved portions (grooved channel portions or depressed portions) as in FIG. 3, the circular part represents an outer peripheral edge of the penetrating hole disposed on an inner peripheral surface of the outer side cylindrical body. Further in the schematic view as in FIG. 3, the grooved portions provided in the inner side cylindrical body are represented in white color, and the part of the outer peripheral surface that the grooved portions of the inner side cylindrical body are not provided are represented in gray color.

Figure 4:
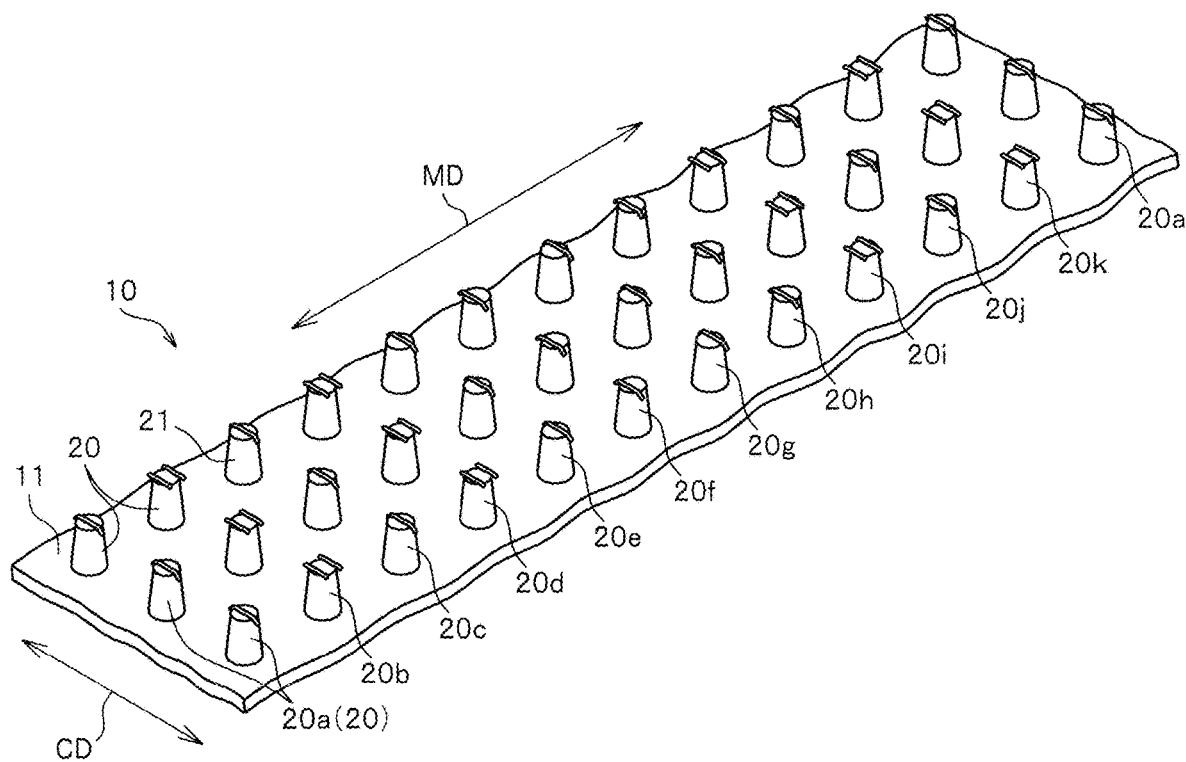
FIG. 4 is a perspective view illustrating the molded surface fastener manufactured in Embodiment 1.
Figure 5:
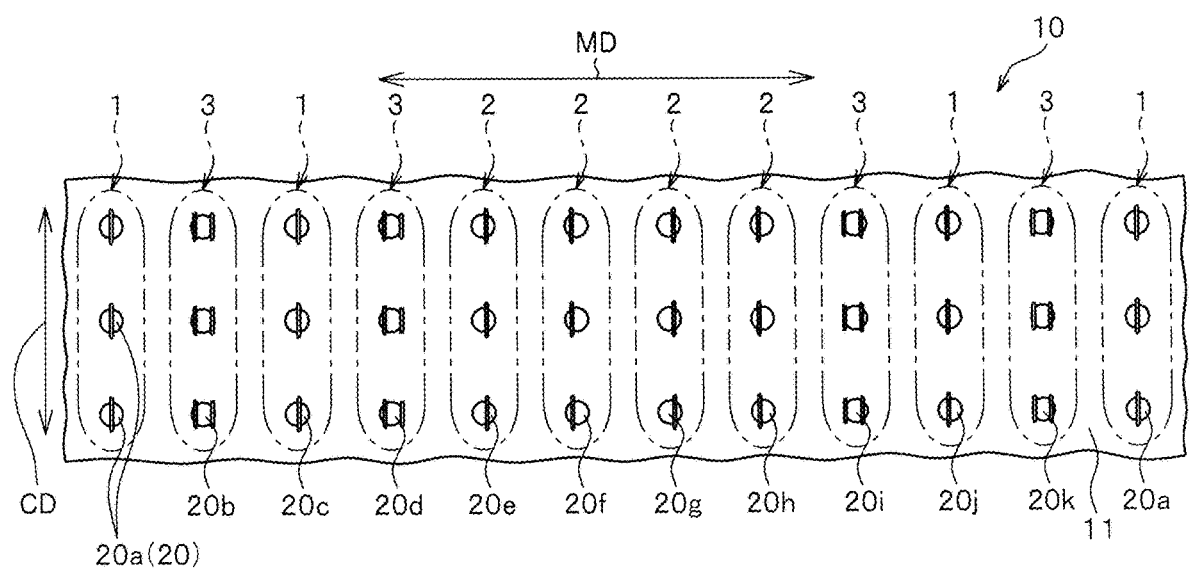
FIG. 5 is a plan view of the molded surface fastener.
Figure 6:
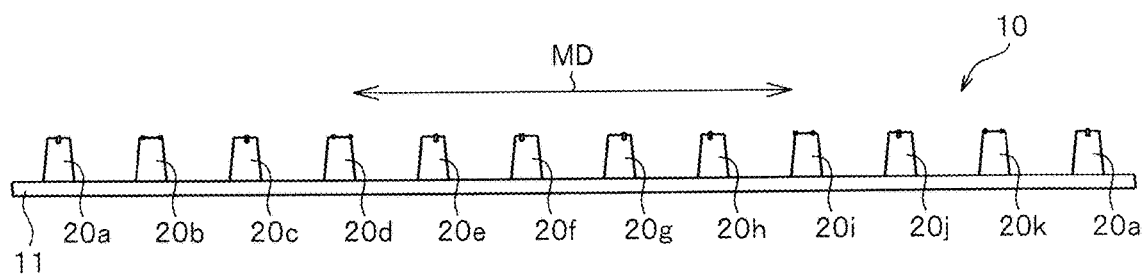
FIG. 6 is a side view of the molded surface fastener.
Figure 7:
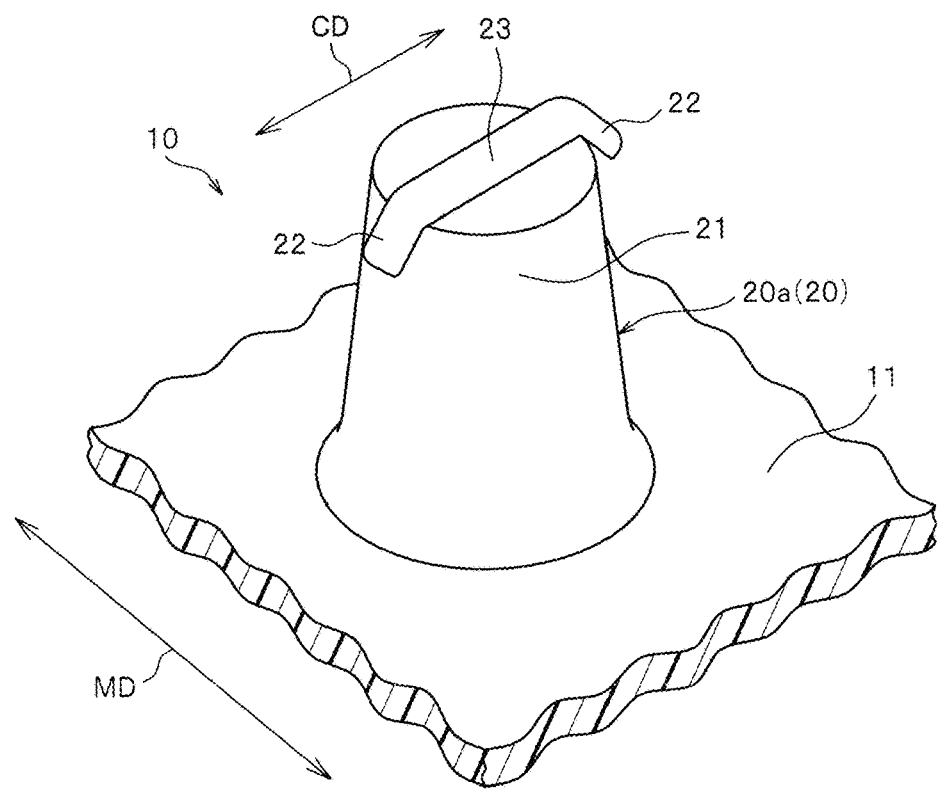
FIG. 7 is an enlarged perspective view illustrating one engaging element of the molded surface fastener.
Figure 8:
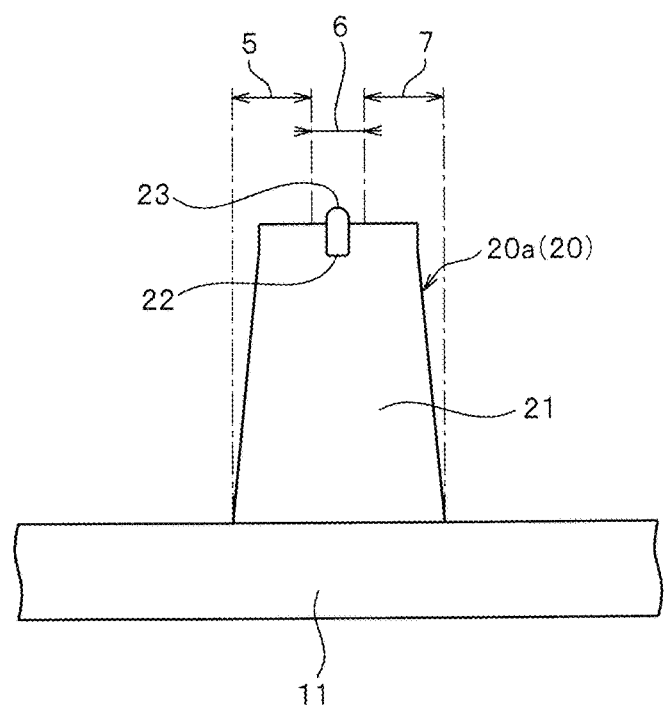
FIG. 8 is a schematic explanation view explaining a first end part area, a center area and a second end part area of the engaging element.
Figure 9:
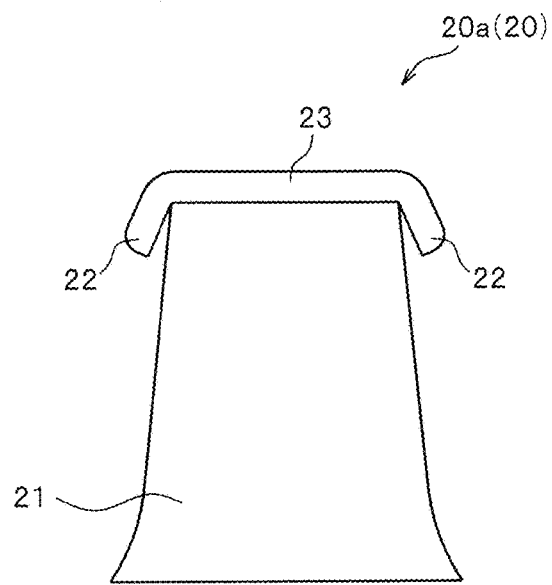
FIG. 9 is a front view illustrating one engaging element only.

FIGS. 4, 5, and 6 are a perspective view, a plan view and a side view, respectively, schematically illustrating the molded surface fastener manufactured in Embodiment 1. FIGS. 7, 8 and 9 are a perspective view, a side view and a front view enlarging one engaging element of the molded surface fastener (first engaging element as described later).

In the following explanation, a front and rear direction regarding a molded surface fastener and a primary molded body described later means a length direction of the molded surface fastener and the primary molded body molded long. The front and rear direction (length direction) also means a direction along a machine direction (M direction or MD) in which a molded surface fastener or a primary molded body flow in a manufacturing step of the molded surface fastener.

A right and left direction means a width direction perpendicular to a length direction and along an upper surface (or a lower surface) of the base portion of the molded surface fastener and the primary molded body. In this case, the right and left direction (width direction) is a perpendicular direction (C direction or CD) perpendicular to the machine direction (MD) in the manufacturing step of the molded surface fastener. An upper and lower direction (thickness direction) means a height direction perpendicular to the length direction and perpendicular to an upper surface (or lower surface) of the base portion of the molded surface fastener.

In Embodiment 1, a synthetic resin molded surface fastener 10 having a flat plate-shaped base portion 11 and a plurality of engaging elements 20 standing on an upper surface of the base portion 11 as shown in FIGS. 4 to 6 are manufactured by using a manufacturing apparatus 30 shown in FIG. 1. In this case, thermoplastic resins such as polypropylene, polyester, nylon, polybutylene terephthalate or copolymer thereof are suitably employed as the synthetic resin forming the molded surface fastener 10. It should be noted that the material of the molded surface fastener 10 is not particularly limited.

The molded surface fastener 10 manufactured in Embodiment 1 is briefly explained here. In the molded surface fastener 10 of Embodiment 1, eleven kinds of engaging elements 20 having different shapes from each other in a plan view of the engaging element 20, more specifically eleven kinds of engaging elements 20 having different position relations of the pawl portions 22 with respect to the stem portions 21 in a plan view, are disposed serially along the length direction (machine direction). Further, the same kind of engaging elements disposed at the same position relation of the pawl portions 22 with respect to the stem portions 21 are cyclically disposed along the length direction (machine direction) at a cycle of eleven engaging elements 20. In other words, between the same kind of engaging elements disposed in the length direction (machine direction), ten kinds of engaging elements 20 having different position relations of the pawl portions 22 from that of the engaging element 20 are disposed. In the molded surface fastener 10 of Embodiment 1, the same kind of engaging elements 20 having the same position relations of the pawl portions 22 to the stem portion 21 are disposed to line along the width direction (perpendicular direction) of the molded surface fastener 10.

The manufacturing apparatus 30 of Embodiment 1 to manufacture such a molded surface fastener 10 has a molding apparatus 31 which molds the molded surface fastener 10, and a conveying apparatus not shown in the drawing and which conveys and cools the molded surface fastener 10 after being molded by the molded apparatus 31.

The molding apparatus 31 of Embodiment 1 has a die wheel 32 driving rotationally in one direction (anti-clockwise direction in the drawing), an extrusion nozzle 36 disposed opposite to a circumferential surface of the die wheel 32 and discharging molten synthetic resin material continuously, and a pickup roller 37 disposed on the downstream side of the extrusion nozzle 36 in the rotating direction of the die wheel 32.

The die wheel 32 has an outer side cylindrical body 33 disposed as one of mold members and having a cylindrical shape, an inner side cylindrical body 34 disposed as one of the mold members and in close contact with an inside of the outer side cylindrical body 33, and a rotational driving roller 35 rotating the outer side cylindrical body 33 and the inner side cylindrical body 34 in one direction. The outer side cylindrical body 33 and the inner side cylindrical body 34 are also referred to as an outer side sleeve and an inner side sleeve, or an outside cylindrical mold and an inside cylindrical mold. Inside the rotational driving roller 35, a cooling jacket not shown in the drawing and distributing coolant is provided, thereby the molded surface fastener 10 to be molded on the circumferential surface of the die wheel 32 can be efficiently cooled.

In the outer side cylindrical body 33 of the die wheel 32, a plurality of penetrating holes 38 penetrating the outer side cylindrical body 33 from the outer peripheral surface to the inner peripheral surface are provided as a cavity for molding the stem portions 21 of the molded surface fastener 10. The plurality of penetrating holes 38 formed on one outer side cylindrical body 33 have the same shape and the same size each other. The plurality of penetrating holes 38 on the outer side cylindrical body 33 are formed to correspond to the placement positions of the engaging elements 20 of the molded surface fastener 10 to be manufactured.

In the case of Embodiment 1, the penetrating holes 38 are formed having constant pitches in the peripheral direction which becomes M direction (MD) of the outer side cylindrical body 33, and formed at predetermined pitches in C direction (CD) parallel to the center shaft of the outer side cylindrical body 33. In this case, the pitch in the M direction and the pitch in C direction of the penetrating holes 38 are abbreviated as a penetrating hole MD pitch P1 and a penetrating hole CD pitch P2, respectively. Dimension tolerance of plus or minus 10% may be permitted in the penetrating hole 38 formed on the outer side cylindrical body 33.

In Embodiment 1, the penetrating hole MD pitch P1 and the penetrating hole CD pitch P2 are set at the same size, and in the case of Embodiment 1, the penetrating hole MD pitch P1 and the penetrating hole CD pitch P2 are set at 600 μm. In the present invention, the sizes of the penetrating hole MD pitch P1 and the penetrating hole CD pitch P2 can be arbitrarily changed. The penetrating hole MD pitch P1 and the penetrating hole CD pitch P2 can be set at different sizes from each other. Each penetrating hole 38 of Embodiment 1 has a substantially cone-shape such that a circular shape on the outer peripheral surface of the outer side cylindrical body 33 is formed larger than a circular shape on the inner peripheral surface of the outer side cylindrical body 33.

Such an outer side cylindrical body 33 is formed by producing a primary outer side cylindrical body having a cylindrical shape which is not shown in the drawing, and thereafter penetrating a plurality of the penetrating holes 38 to the primary outer side cylindrical body at predetermined positions. In this case, the primary outer side cylindrical body is produced from a conventionally known metal such as nickel and stainless steel. The primary outer side cylindrical body is preferably formed to be seamless having no seam by forming a metal plate member having a predetermined thickness and a length by extending by applying pressure, and rolling the metal plate member in a cylindrical shape and welding it. For processing a plurality of the penetrating holes 38 to the obtained primary outer side cylindrical body, a known general technology can be used, and laser processing, electron beam processing, mechanical processing including hole making processing and etching processing can be used.

On an outer peripheral surface of the inner side cylindrical body 34 of Embodiment 1, a plurality of grooved channel portions (grooved portions) 40 are grooved linearly along C direction (CD) parallel to the center shaft of the cylindrical body as cavities forming rib portions 23 described later and the pawl portions 22 of the engaging element 20. The plurality of grooved channel portions 40 provided on the inner side cylindrical body 34 have the same shape and the same size each other.

The inner side cylindrical body 34 of Embodiment 1 is produced by, for example, forming a metal plate member having a predetermined thickness and a length by extending by applying pressure, forming a plurality of grooved channel portions 40 by laser processing, electron beam processing, mechanical processing including hole making processing and etching processing to the metal plate member, and thereafter, rolling the metal plate member in a cylindrical shape and welding it. It should be noted that in the present invention, the forming method of the outer side cylindrical body 33 and the inner side cylindrical body 34 are not particularly limited.

Each grooved channel portion 40 of the inner side cylindrical body 34 has a groove width and a groove depth into which synthetic resin for forming the molded surface fastener 10 can flow in a molten state. Each grooved channel portion 40 of Embodiment 1 has a flat groove bottom surface such that a cross-sectional shape perpendicular to C direction shows a square shape and a pair of groove side wall surfaces facing to and disposed parallel to each other. The grooved channel portion 40 of the inner side cylindrical body 34 may be formed to have a substantially U-shaped cross-section instead of the above-mentioned square-shaped cross-section.

The groove width (distance between the pair of the groove side wall surfaces) of each grooved channel portion 40 is set at 10 μm or larger and 100 μm or smaller. The groove depth (dimension from the outer peripheral surface of the inner side cylindrical body 34 to the groove bottom surface of the grooved channel portion 40) is set at 5 μm or larger and 50 μm or smaller. The groove width and the groove depth of the grooved channel portion 40 can be arbitrarily changed in the present invention.

The grooved channel portions 40 parallel to C direction are formed in a peripheral direction which is M direction (MD) of the inner side cylindrical body 34 at constant pitches. In this case, the pitch of the grooved channel portions 40 in M direction is abbreviated to a grooved channel MD pitch P3. In Embodiment 1, the grooved channel MD pitch P3 is smaller than the penetrating hole MD pitch P1 and smaller than a size of the penetrating hole 38 in M direction of the outer side cylindrical body 33. Particularly in this case, the specific size of the grooved channel MD pitch P3 is set at 110 μm.

The grooved channel MD pitch P3 is a size having a value which is not divisible with an integer (natural number) with respect to the penetrating hole MD pitch P1. Therefore, as shown in FIG. 3, for example, in two penetrating holes 38 disposed adjacent to each other in M direction of the outer side cylindrical body 33, the relative position relation of the grooved channel portions 40 of the inner side cylindrical body 34 with respect to the penetrating holes 38 can be different from each other.

In the die wheel 32 of Embodiment 1, when the relation of the grooved channel portions 40 of the inner side cylindrical body 34 with respect to the penetrating holes 38 of the outer side cylindrical body 33 is viewed, the grooved channel portions 40 formed along C direction on the inner side cylindrical body 34 are, as shown in FIG. 3, classified into two kinds of grooved channel portions 40, i.e. a use grooved channel portion 41 disposed to intersect with the penetrating hole 38 of the outer side cylindrical body 33, and a non-use grooved channel portion 42 disposed between the penetrating holes 38 adjacent to each other in M direction of the outer side cylindrical body 33 and does not intersect with the penetrating hole 38.

In this case, the use grooved channel portion 41 of the inner side cylindrical body 34 is the grooved channel portion 40 into which molten synthetic resin material is flowed when the molded surface fastener 10 is molded with the die wheel 32. The non-use grooved channel portion 42 of the inner side cylindrical body 34 is the grooved channel portion 40 covered by the inner peripheral surface of the outer side cylindrical body 33 and into which the molten synthetic resin material cannot be flowed when the molded surface fastener 10 is molded with the die wheel 32. In Embodiment 1, the non-use grooved channel portions 42 into which the synthetic resin material is not flowed are disposed in all areas formed between the penetrating holes 38 adjacent to each other in M direction of the outer side cylindrical body 33.

As large number of the grooved channel portions 40 are formed on the inner side cylindrical body 34 to intentionally provide the non-use grooved channel portions 42 as above, even when processing accuracy of the outer side cylindrical body 33 and the inner side cylindrical body 34 is not high, and positions of the penetrating holes 38 formed on the outer side cylindrical body 33 or the positions of the grooved channel portions 40 formed on the inner side cylindrical body 34 are slightly displaced, at least one grooved channel portion 40 of the inner side cylindrical body 34 can be provided to intersect with respect to each penetrating hole 38 of the outer side cylindrical body 33. Thereby, the molded surface fastener 10 in which all the engaging elements 20 respectively have at least a right and left pair of the pawl portions 22 can be stably manufactured.

Also, in each penetrating hole 38 of the outer side cylindrical body 33, at least one grooved channel portion 40 of the inner side cylindrical body 34 is disposed to intersect with a circular-shaped outer peripheral edge of the penetrating hole 38 on the inner peripheral surface of the outer side cylindrical body 33 as the use grooved channel portion 41. Thereby, the circular-shaped outer peripheral edge of the penetrating hole 38 formed on the inner peripheral surface side of the outer side cylindrical body 33 has at least two groove-overlapped parts overlapping the grooved channel portion 40 of the inner side cylindrical body 34, and at least two close contact parts having an arc shape disposed between the overlapped parts and in direct close contact with the outer peripheral surface of the inner side cylindrical body 34. Thereby, in the molded surface fastener 10 molded with the die wheel 32, the plurality of engaging elements 20 each having the stem portion 21, the rib portion 23 and at least two pawl portions 22 as shown in FIGS. 4 to 9 can be stably formed on the base portion 11.

Furthermore, the least common multiple between the penetrating hole MD pitch P1 (600 μm) and the grooved channel MD pitch P3 (110 μm) is 6600 μm in the die wheel 32 of Embodiment 1. In Embodiment 1, the size of the least common multiple is larger than the penetrating hole MD pitch P1.

Also in this case, the value calculated by dividing the least common multiple by the penetrating hole MD pitch P1 is "11". The calculated value represents the number of kinds of the penetrating holes 38 formed to have different position relations of the grooved channel portions 40 (use grooved channel portions 41) of the inner side cylindrical body 34 with respect to the penetrating holes 38 in M direction of the outer side cylindrical body 33, and represents a cycle (the number of the penetrating holes 38 forming one cycle) in a case that the same kind of the penetrating holes 38 having the same position relations of the grooved channel portions 40 (use grooved channel portions 41) of the inner side cylindrical body 34 with respect to the penetrating holes 38 are cyclically disposed in M direction of the outer side cylindrical body 33. Further, the calculated value "11" corresponds to the number of the engaging elements 20 disposed in one cycle in the molded surface fastener 10 on which the same kind of the engaging elements 20 are cyclically disposed in the length direction, as mentioned above.

A pickup roller 37 of Embodiment 1 has a pair of upper holding roller 37a and a lower holding roller 37b which vertically hold the molded surface fastener 10 molded on the outer peripheral surface of the die wheel 32. An outer peripheral surface part of the upper holding roller 37a to which the molded surface fastener 10 is contacted and an outer peripheral surface part of the lower holding roller 37b to which the molded surface fastener 10 is contacted are provided with a top surface layer not shown in the drawing and formed of elastomer such as polyurethane elastomer.

The upper holding roller 37a and the lower holding roller 37b of the pickup roller 37 are disposed to face each other with a predetermined interval. Since these upper holding roller 37a and the lower holding roller 37b are rotated at a predetermined speed in a predetermined direction, thereby the molded surface fastener 10 can be conveyed on the downstream side smoothly while being peeled off from the die wheel 32 continuously.

At the pickup roller 37, just after the molded surface fastener 10 is peeled off from the die wheel 32, the molded surface fastener 10 is held between the upper holding roller 37a and the lower holding roller 37b to be conveyed to the downstream side. By peeling off the molded surface fastener 10 from the die wheel 32 forcibly, even when the pawl portions 22 of the engaging elements 20 in the molded surface fastener 10 are formed so as to protrude diagonally upward, for example, it is possible that the pawl portions 22 of the engaging elements 20 are deformed so as to protrude downward to the base portion 11 in an oblique or curved manner, or protrude parallel to the upper surface of the base portion 11.

The conveying apparatus not shown in the drawing in the manufacturing apparatus 30 of Embodiment 1 has a conveying roller and the like, and is formed to be able to cool the molded surface fastener 10 peeled off from the die wheel 32 by the pickup roller 37 while conveying it laterally. In the present invention, the structure of the conveying apparatus is not limited, and installation of the conveying apparatus can be omitted.

In Embodiment 1, when the molded surface fastener 10 is manufactured using the manufacturing apparatus 30 having the above-mentioned molding apparatus 31 and the conveying apparatus not shown in the drawing, a molten synthetic resin is continuously extruded from an extrusion nozzle 36 toward the outer peripheral surface of the die wheel 32. At this time, the die wheel 32 is driving rotationally in one direction.

Therefore, by continuously extruding the synthetic resin material to the peripheral surface of the die wheel 32, the base portion 11 of the molded surface fastener 10 is continuously molded between the extrusion nozzle 36 and the die wheel 32. In this case, an interval between the extrusion nozzle 36 and the die wheel 32 is adjusted to a size corresponding to a thickness dimension of the base portion 11 of the molded surface fastener 10 to be manufactured.

When the base portion 11 is molded as above, a plurality of engaging elements 20 are integrally molded on an upper surface of the base portion 11 simultaneously with the outer side cylindrical body 33 and the inner side cylindrical body 34 of the die wheel 32 as mentioned above. At this time, the molten synthetic resin material extruded from the extrusion nozzle 36 is cured by being supported, cooled and half-rotated on the outer peripheral surface of the die wheel 32, thereby the molded surface fastener 10 having the flat plate-shaped base portion 11 formed in a long length in the machine direction as shown in FIGS. 4 to 6, and a plurality of the engaging elements 20 standing on the upper surface of the base portion 11 is molded.

Further, the molded surface fastener 10 molded by the die wheel 32 is continuously peeled off from the outer peripheral surface of the die wheel 32 by the pickup roller 37. Thereafter, the molded surface fastener 10 peeled off from the die wheel 32 is conveyed to a cutting part not shown in the drawing, cut in a predetermined length at the cutting part and collected. Alternatively, the molded surface fastener 10 peeled off from the die wheel 32 and having a long length in the machine direction is rolled and collected by a collecting roller and the like in a long state.

By using the above manufacturing method, the molded surface fastener 10 of Embodiment 1 as shown in FIGS. 4 to 6 is manufactured.

The molded surface fastener 10 of Embodiment 1 has a thin plate-shaped base portion 11 formed to have a constant thickness, and a plurality of engaging elements 20 provided to stand on an upper surface of the base portion 11. The plurality of engaging elements 20 are disposed to line regularly along the length direction which is the machine direction (MD) and a width direction which is a perpendicular direction (CD).

That is, the plurality of engaging elements 20 are disposed at constant forming pitches along the length direction of the base portion 11, and are disposed at constant forming pitches along the width direction of the base portion 11. In this case, each size of the forming pitch of the engaging elements 20 in the length direction and the forming pitch in the width direction correspond to the above-mentioned penetrating hole MD pitch P1 and the penetrating hole CD pitch P2. In this case, the dimensional tolerance of the penetrating holes 38 in the outer side cylindrical body 33 are reflected to product dimensions. In the present invention, placement pattern of the engaging elements 20 in the molded surface fastener 10 is not limited, and the forming pitches of the engaging elements 20 in the length direction and the width direction can be set arbitrarily.

Each engaging element 20 of Embodiment 1 has a stem portion 21 standing up from the base portion 11 and provided with a substantially cone shape, one or two rib portions 23 protruded on an upper end surface of the stem portion 21 along the right and left direction (CD), and two or four pawl portions 22 protruded outward from right and left side end edges of each rib portion 23. That is, the engaging elements 20 of Embodiment 1 include two-pawl engaging element 20 having two pawl portions 22 per stem portion 21 and four-pawl engaging element 20 having four pawl portions 22 per stem portion 21.

In Embodiment 1, the upper end surface of the stem portion 21 has a circular shape in a plan view of the engaging element 20. In the present invention, a shape of the stem portion 21 is not limited to the cone shape as mentioned above. The rib portion 23 is bulged upward from the upper end surface of the stem portion 21, and disposed linearly along C direction. Each pawl portion 22 extending from the rib portion 23 toward the right and left direction is formed to protrude outward from the upper end outer peripheral edge (outer peripheral edge of the circular-shaped upper end surface of the stem portion 21) in a plan view of the engaging element 20. Further, each pawl portion 22 of Embodiment 1 is formed to decline diagonally downward toward the base portion 11 via a bent portion from the side end edge of the rib portion 23 so that a pawl tip end is hung down.

In the engaging element 20 of Embodiment 1, there is nothing formed to bulge outward from the outer peripheral edge of the circular-shaped upper end surface of the stem portion 21 except the pawl portion 22. That means, in each engaging element 20 of Embodiment 1, a disc-shaped engaging head portion such as a conventional mushroom-type engaging element is not provided, and any engaging factor to engage a loop is not formed other than the pawl portion 22.

The molded surface fastener 10 of Embodiment 1 is molded using the die wheel 32 having the least common multiple between the penetrating hole MD pitch P1 of the outer side cylindrical body 33 and the grooved channel MD pitch P3 of the inner side cylindrical body 34 is larger than the penetrating hole MD pitch P1, and the value calculated by dividing the least common multiple by the penetrating hole MD pitch P1 is "11". Therefore, in the molded surface fastener 10 of Embodiment 1, when the length direction (machine direction) of the molded surface fastener 10 is defined as the reference direction, eleven kinds of the engaging elements 20 having different shapes (particularly the position relations of the pawl portions 22 with respect to the stem portion 21 in a plan view of the molded surface fastener 10) in a plan view of the molded surface fastener 10 are disposed serially along the reference direction.

That is, the plurality of engaging elements 20 disposed in a line along the length direction of the molded surface fastener 10 include the eleven kinds of engaging elements 20 having different position relations of the pawl portions 22 in a plan view of the molded surface fastener 10. In this case, the eleven kinds of engaging elements 20 having the different position relations of the pawl portions 22 are referred to as a first engaging element 20$a$ to an eleventh engaging element 20$k$, respectively, for convenience.

In a case of the molded surface fastener 10 of Embodiment 1 as shown in FIGS. 5 and 6 in particular, the engaging element 20 located on the far left is defined as the first engaging element 20$a$, and the engaging elements 20 disposed serially from the first engaging element 20$a$ along the length direction are defined as the second engaging element 20$b$ to the eleventh engaging element 20$k$, respectively.

In Embodiment 1, two engaging elements 20 disposed to be apart and between which the eleven engaging elements 20 are disposed in the length direction are the same kind of engaging elements 20 having the same position relations of the pawl portions 22 each other as above. In FIGS. 5 and 6, for example, the twelfth engaging element 20 disposed in the length direction from the first engaging element 20$a$ disposed as the first on the far left side (the engaging element 20 disposed on the far right side in FIGS. 5 and 6) is the first engaging element 20$a$ having the same position relation of the pawl portions 22. Further, the engaging elements 20 disposed adjacent to each other in the length direction (the first engaging element 20$a$ and the second engaging element 20$b$, or the second engaging element 20$b$ and the third engaging element 20$c$, for example) are formed to have different position relations of the pawl portions 22 from each other.

That is, in Embodiment 1, the same kind of engaging elements 20 disposed with the same position relation of the pawl portions 22 with respect to the stem portion 21 (first engaging element 20$a$, for example) are cyclically disposed every eleven engaging elements 20 along the length direction as the reference direction of the molded surface fastener 10.

Since a size of each engaging element 20 of Embodiment 1 is very small, it may be difficult to form all the engaging elements 20 in designed shapes. Further, when the molded surface fastener is manufactured using a molding die, the shapes of the engaging elements (the shape and the size of the pawl portion, in particular) may be different from the same kind of other engaging elements due to various reasons even when the engaging elements are molded from the same-shaped molding cavities. Therefore, in the present invention, as long as the position relations of the pawl portions in the engaging elements are substantially same, they can be judged as the same kind of engaging element even when the shape and size of the pawl portions are different slightly.

In Embodiment 1, the eleven kinds of the first engaging elements 20a to the eleventh engaging element 20k are cyclically disposed at predetermined cycles in the length direction. However, in the present invention, it is sufficient that at least two kinds of engaging elements having different shapes at least in a plan view are cyclically disposed at predetermined cycles. That is, when the size of each engaging element is so small that some engaging elements are deformed from the predetermined shapes, and if at least two kinds of engaging elements 20 (first engaging element 20a and the fifth engaging element 20e, for example) are cyclically disposed in the length direction at a cycle of the eleven engaging elements 20 of the molded surface fastener, thus the molded surface fastener is included in the present invention. In this case, it is further preferable that at least four kinds of engaging elements 20 are cyclically disposed, particularly, half the kinds of engaging elements 20 among the engaging elements 20 disposed on one cycle (i.e. at least six kinds of engaging elements 20) are cyclically disposed.

Further in the molded surface fastener 10 of Embodiment 1, the engaging elements 20 disposed in line along the width direction (perpendicular direction) of the molded surface fastener 10 are formed as the same kind of engaging elements 20 having the same position relation of the pawl portions 22 with respect to the stem portion 21. That is, the first engaging elements 20a to the eleventh engaging elements 20k are respectively disposed to line in a row in the width direction of the molded surface fastener 10.

Particularly in the molded surface fastener 10 of Embodiment 1, the eleven kinds of first engaging elements 20a to the eleventh engaging elements 20k having different position relations of the pawl portions 22 with respect to the stem portion 21 as mentioned above are disposed serially along the length direction, and these eleven kinds of engaging elements 20 can be roughly classified into three shapes as below.

Specifically regarding the shape of each engaging element 20, the engaging element 20 is divided as shown in FIG. 8 into a first end part area 5 including an end part (front end part) 5 on one side in the length direction, a second end part area 7 including an end part (rear end part) on the other side in the length direction and a center area 6 including a center part in the length direction. In this case, the three areas are preferably divided with equal dimensions in the length direction, but may be divided with different dimensions.

Then, in a plan view that the engaging element 20 is viewed from above (see FIG. 5, for example), the engaging element 20 that two pawl portions 22 (a right and left pair of pawl portions 22) are provided to one stem portion 21, and these pawl portions 22 are disposed on the center area 6 of the engaging element 20 is defined as a first shape element 1. That means, the first shape element 1 is the engaging element 20 that a right and left pair of pawl portions 22 are provided on the center part or nearby in the length direction.

The engaging element 20 that two pawl portions 22 (a right and left pair of pawl portions 22) are provided to one stem portion 21, and these pawl portions 22 are disposed on the first end part area 5 or the second end part area 7 of the engaging element 20 is defined as a second shape element 2. That means, the second shape element 2 is the engaging element 20 that the right and left pair of pawl portions 22 are provided close to either end part in the length direction. Further, the engaging element 20 that four pawl portions 22 (two pairs of a right and left pair of pawl portions 22) are provided to one stem portion 21 is defined as a third shape element 3.

When the engaging elements 20 are roughly classified into the above three shapes, as mentioned above, in the molded surface fastener 10 of Embodiment 1, the first engaging element 20a, the third engaging element 20c and the tenth engaging element 20j are formed as the first shape element 1. The second engaging element 20b, the fourth engaging element 20d, the ninth engaging element 20i and the eleventh engaging element 20k as mentioned above are formed as the third shape element 3. Further, the fifth engaging element 20e to the eighth engaging element 20h are formed as the second shape element 2. Thus, the four second shape elements 2 are continuously disposed in the length direction in the molded surface fastener 10 of Embodiment 1.

Then, in the molded surface fastener 10 of Embodiment 1, the first shape elements 1, the second shape elements 2 and the third shape elements 3 are disposed at regular constant placement pattern as above at every cycle of the eleven kinds of engaging elements 20 in the length direction as mentioned above. By roughly classifying all the engaging elements 20 provided on the molded surface fastener 10 into the first shape elements 1, the second shape elements 2 and the third shape elements 3 depending on the placement of the pawl portions 22, the cyclicity of the engaging elements 20 in the molded surface fastener 10 can be judged relatively easily.

Then, the molded surface fastener 10 of Embodiment 1 having the above structure is manufactured using the molding apparatus 31 having the inner side cylindrical body 34 on which the two kinds of grooved channel portions 40, that is the use grooved channel portions 41 and the non-use grooved channel portions 40, are grooved in the inner side cylindrical body 34 as shown in FIGS. 1 to 3, each engaging element 20 can be provided with at least a right and left pair of pawl portions 22 to one stem portion 21.

Therefore, even when the position of the pawl portions 22 with respect to the stem portion 21 is slightly displaced from the designed position due to low processing accuracy at the time of forming the penetrating holes 38 on the outer side cylindrical body 33 of the molding apparatus 31 or low processing accuracy at the time of forming the grooved channel portions 40 on the inner side cylindrical body 34, the molded surface fastener 10 of Embodiment 1 can be provided with a stable engaging strength or a peeling strength with respect to a female surface fastener (non-woven fabric) having a plurality of loops.

In the molded surface fastener 10 of Embodiment 1 in particular, the eleven kinds of engaging elements 20 having different position relations of the pawl portions 22 with respect to the stem portion 21 are cyclically disposed along the length direction. By intentionally forming the plural kinds of engaging elements 20 having different position relations of the pawl portions 22 as above, even when the position of the penetrating hole 38 and the position of the grooved channel portion 40 are displaced, an influence of the displacement to the engaging strength or the peeling strength of the molded surface fastener 10 can be suppressed.

Further, the eleven kinds of engaging elements 20 having different position relations of the pawl portion 22 with respect to the stem portion 21 are cyclically disposed along the length direction, and the same kind of engaging elements 20 having the same position relations of the pawl portions 22 are disposed at such a short cycle as every eleven engaging elements 20, thereby the following effects can be obtained.

Specifically, when a molding apparatus having a die wheel that the penetrating holes 38 of the outer side cylindrical body 33 and the grooved channel portions 40 of the inner side cylindrical body 34 intersect with each other at predetermined certain positions each other regarding the machine direction (that is, the die wheel having the value of the least common multiple between the penetrating hole MD pitch P1 and the grooved channel MD pitch P3 as mentioned above is the same value of the penetrating hole MD pitch P1) is used as a molding apparatus 31 of the molded surface fastener 10, a position displacement due to processing accuracy may be formed between the penetrating hole 38 of the outer side cylindrical body 33 and the grooved channel portion 40 of the inner side cylindrical body 34.

In this case, in the molded surface fastener manufactured using the molding apparatus, the engaging elements having position relations of the pawl portions slightly different from each other with respect to the stem portion are disposed along the length direction of the molded surface fastener. Further, the cycle that the same kind of engaging elements having substantially same position relation of the pawl portions are formed again is the length that engaging elements exceeding 40 are disposed in the length direction of the molded surface fastener, which is the molded surface fastener having long cyclicity of the engaging elements.

However, when such a molded surface fastener having long cyclicity of the engaging elements are cut in a predetermined small size such that the number of the engaging elements disposed along the length direction is 30 or smaller, for example, shapes of the engaging elements disposed in every small cut piece are different. Therefore, when the molded surface fastener with the small cut piece size is attached to a final product, a defect of difference in performance of the molded surface fastener in each final product may occur.

On the contrary, in the molded surface fastener 10 of Embodiment 1, the eleven kinds of the engaging elements 20 are disposed at constant cycle along the length direction as mentioned above. Therefore, even when the molded surface fastener 10 is cut into predetermined small sizes such that the number of the engaging elements 20 disposed in the length direction is 30 or less, at least two cycles of the eleven kinds of engaging elements 20 can be provided on the obtained each small cut piece. Therefore, even when the molded surface fastener 10 is attached to a final product with a size of the small cut piece, the performance of the molded surface fastener 10 in each final product can be less likely to be different.

Further in the molded surface fastener 10 of Embodiment 1, since the eleven kinds of engaging elements 20 are cyclically disposed along the length direction, strength and weakness of the engaging elements 20 between different kinds of engaging elements 20 can be complemented each other. Thereby, the performance of the manufactured molded surface fastener 10 can be stabilized, and can be less likely affected by a type of non-woven fabric (female surface fastener). That is, the molded surface fastener 10 of Embodiment 1 is the molded surface fastener 10 stably provided with a fastener performance such as engaging strength appropriately to various non-woven fabrics.

In Embodiment 1, the pawl portion 22 is formed such that the pawl portions 22 provided on each engaging element 20 is declined from the side end edge of the rib portion 23 toward the base portion 11 diagonally downward, as mentioned above. In the present invention, however, it is also possible to manufacture a molded surface fastener that the pawl portions 22 provided on each engaging element 20 are formed to protrude from the side end edge of the rib portion 23 parallel to the upper surface of the base portion 11.

Embodiment 2

Figure 10:
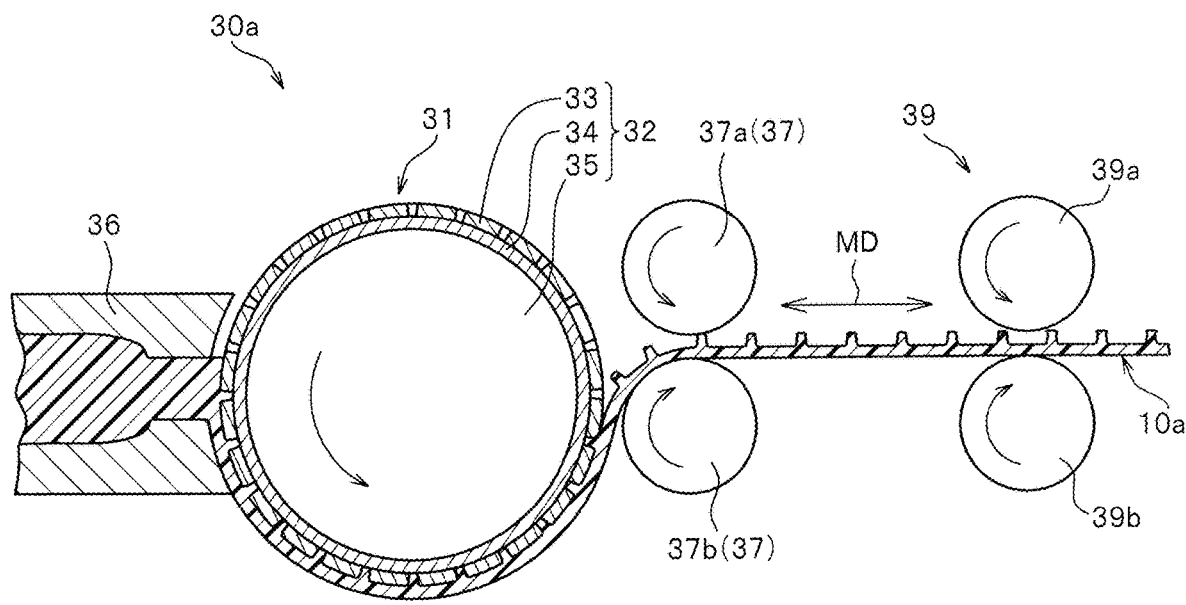
FIG. 10 is a schematic view illustrating schematically a manufacturing apparatus of a molded surface fastener according to Embodiment 2 of the present invention.
Figure 11:
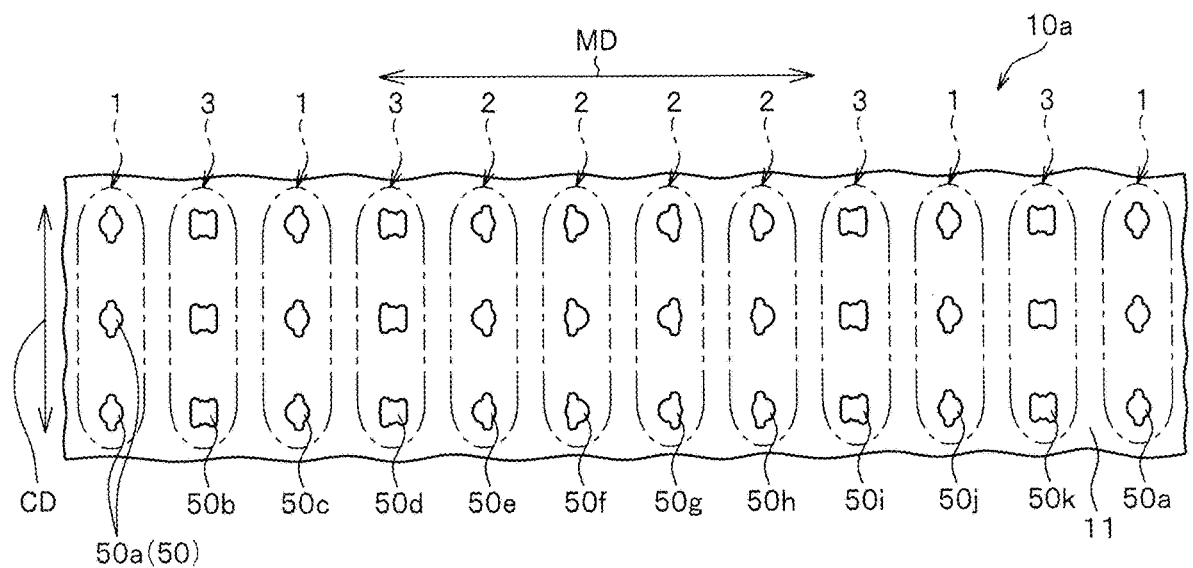
FIG. 11 is a plan view illustrating the molded surface fastener manufactured in Embodiment 2.
Figure 12:
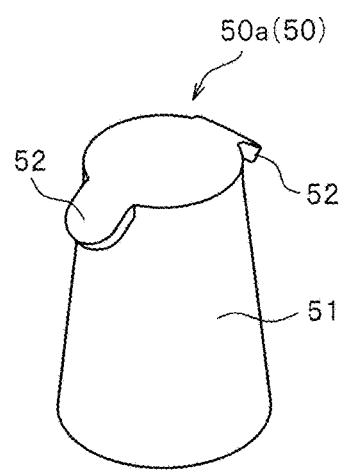
FIG. 12 is an enlarged perspective view illustrating one engaging element only of the molded surface fastener.
Figure 13:
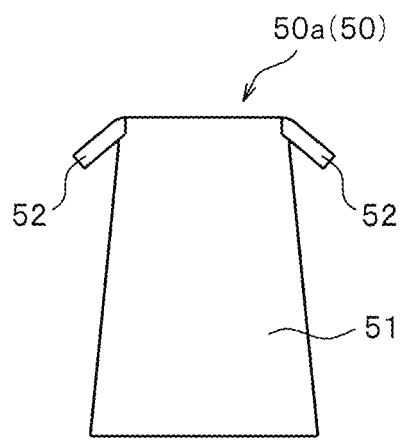
FIG. 13 is a front view illustrating one engaging element only.
Figure 14:
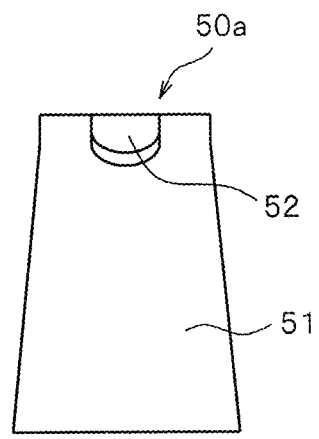
FIG. 14 is a side view illustrating one engaging element only.

FIG. 10 is a schematic view illustrating schematically a manufacturing apparatus of a molded surface fastener according to Embodiment 2. FIG. 11 is a plan view illustrating the molded surface fastener manufactured in Embodiment 2. FIGS. 12, 13 and 14 are an enlarged perspective view, a front view and a side view illustrating one engaging element (first engaging element) of the molded surface fastener.

Accordingly, in Embodiment 2, and Embodiment 3 described later and each modification example, different structures from the molded surface fastener according to the above-mentioned Embodiment 1 are mainly explained. The explanation of parts or members having substantially the same structures as the molded surface fastener 10 according to the above-mentioned Embodiment 1 is omitted by using the same reference signs.

In Embodiment 2, the manufacturing apparatus 30a as shown in FIG. 10 is used, thereby synthetic resin molded surface fastener 10a having a flat plate-shaped base portion 11 and a plurality of engaging elements 50 standing on the upper surface of the base portion 11 shown in FIG. 11 is manufactured. In the molded surface fastener 10a of Embodiment 2, eleven kinds of engaging elements 50 having different shapes of the engaging elements 50 in a plan view (particularly position relations of the pawl portions 52 with respect to the stem portion 51 in a plan view) are serially disposed along the length direction (machine direction), same as the case of Embodiment 1. Further, the same kind of engaging elements 50 having the same position relation of the above-mentioned pawl portions 52 are cyclically disposed along the length direction (machine direction) every eleven engaging elements 50 as one cycle.

The manufacturing apparatus 30a of Embodiment 2 for manufacturing such a molded surface fastener 10a has the molding apparatus 31 performing a primary molding step, a conveying apparatus not shown in the drawing and conveying the primary molded body molded by the primary molding step, and a heat press apparatus 39 heating and pressing the primary molded body. In this case, the same molding apparatus 31 and the conveying apparatus as in the above-mentioned Embodiment 1 are used as the molding apparatus 31 and the conveying apparatus of Embodiment 2.

The heat press apparatus 39 of Embodiment 2 has an upper and lower pair of press rollers (calender rollers) 39a, 39b. The upper press roller 39a and the lower press roller 39b are disposed to face each other with a predetermined interval. In this case, the interval between the upper press roller 39a and the lower press roller 39b can be adjusted by a height adjusting means not shown in the drawing. In a case of Embodiment 2, the interval between the upper press roller 39a and the lower press roller 39b is adjusted corresponding to a height dimension from a lower surface (back surface) of the base portion 11 to an upper end surface of the stem portion 51 of the molded surface fastener 10a to be manufactured.

The upper press roller 39a has a heating source inside which is not shown in the drawing. In this case, a surface temperature of the upper press roller 39a is set at a temperature able to soften synthetic resin forming the molded surface fastener 10a. Specifically, the temperature is set at a predetermined temperature from the melting point of the synthetic resin minus 40° C. or higher to the melting point minus 10° C. or lower. The upper press roller 39a is disposed to rotate anti-clockwise in FIG. 10. An outer peripheral surface of the upper press roller 39a becomes a surface which presses heated provisional elements of the primary molded body molded in the primary molding step from above.

The lower press roller 39b is disposed to rotate clockwise in FIG. 10, and becomes a supporting surface which supports the primary molded body to be conveyed from the below. In the present invention, it is also possible that, instead of the upper press roller 39a and/or the lower press roller 39b, an upper belt mechanism and/or a lower belt mechanism not shown in the drawing is used. In this case, the upper belt mechanism and the lower belt mechanism respectively have an endless belt and a right and left pair of rotating rollers which winds the endless belt and rotates the endless belt in one direction.

When the molded surface fastener 10a is manufactured using the manufacturing apparatus 30a of Embodiment 2, the primary molding step for molding the primary molded body is first performed using the molding apparatus 31. In the primary molding step, molten synthetic resin material is extruded continuously from the extrusion nozzle 36 toward the outer peripheral surface of the die wheel 32. Thereby, the primary molded body of Embodiment 2 is produced by the molding apparatus 31. In this case, the primary molded body of Embodiment 2 is the same as the molded surface fastener 10 manufactured in the above-mentioned Embodiment 1.

That means, the primary molded body of Embodiment 2 has a plate-shaped base portion 11 and a plurality of provisional elements standing on the upper surface of the base portion 11, and the plurality of provisional elements of Embodiment 2 are formed samely to the plurality of engaging elements 20 in Embodiment 1 as above. In this case, the provisional element has a provisional stem portion, a provisional rib portion and a provisional pawl portion formed to correspond to each of the stem portion 21, the rib portion 23 and the pawl portion 22 of Embodiment 1 as mentioned above.

Next, the primary molded body formed by the molding apparatus 31 of Embodiment 2 is peeled off from the outer peripheral surface of the die wheel 32 by the pickup roller 37. Thereafter, it is conveyed toward the heat press apparatus which performs the secondary molding step, and introduced between the upper press roller 39a and the lower press roller 39b of the heat press apparatus 39.

Then, the primary molded body passes between the upper press roller 39a and the lower press roller 39b, thereby a part of the provisional element is heated and softened by the upper press roller 39a, and the provisional element is pressed from the above. Thereby, the provisional rib portion and a part of the provisional pawl portion provided on the provisional element are compressed and thermally deformed to be flattened, and the engaging element 50 having a shape shown in FIGS. 11 to 14 is formed. Thereby, the molded surface fastener 10a of Embodiment 2 as shown in FIG. 11 is manufactured.

The molded surface fastener 10a of Embodiment 2 has a flat plate-shaped base portion 11 formed to have a constant thickness and a plurality of engaging elements 50 provided to stand on the upper surface of the base portion 11. The plurality of engaging elements 50 are disposed in line regularly along the length direction which is the machine direction (MD) and the width direction which is the perpendicular direction (CD) at constant forming pitches.

Each engaging element 50 of Embodiment 2 has a stem portion 51 standing up from the base portion 11 and having a substantially cone shape, and two or four pawl portions 52 protruded outward from an upper end part of the stem portion 51. In this case, each pawl portion 52 is formed to protrude outward from the upper end outer peripheral edge of the stem portion 51 in a plan view of engaging element 50. Particularly, each pawl portion 52 of Embodiment 1 is formed such that a pawl tip end is declined from the upper end part outer peripheral surface of the stem portion 51 toward the base portion 11 diagonally downward so as to be hung down.

Also in the molded surface fastener 10a of Embodiment 2, a first engaging element 50a to an eleventh engaging element 50k having different position relations of the pawl portions 52 with respect to the stem portion 51 in a plan view of the molded surface fastener 10a are serially disposed, and the same kind of engaging elements 50 are cyclically disposed. Further, the engaging elements 50 disposed in line along the width direction (perpendicular direction) of the molded surface fastener 10a are formed as the same kind of engaging element 50.

Furthermore, when the eleven kinds of engaging elements 50 of Embodiment 2 are roughly classified into three shapes of the first shape element 1, the second shape element 2 and the third shape element 3 as same as the case of the above-mentioned Embodiment 1, the first shape element 1, the second shape element 2 and the third shape element 3 are disposed at a certain placement pattern every cycle of the engaging element 50 in the molded surface fastener 10a of Embodiment 2, same as the case of the above-mentioned Embodiment 1. Therefore, also in Embodiment 2, the four second shape elements 2 are continuously disposed in the length direction.

Then, also by the molded surface fastener 10a of Embodiment 2, the same effect as the molded surface fastener 10 of the above-mentioned Embodiment 1 can be obtained.

Figure 15:
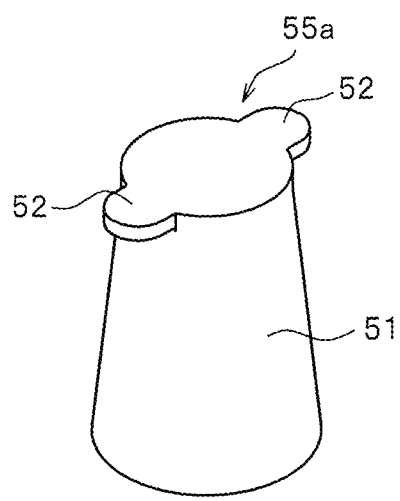
FIG. 15 is an enlarged perspective view illustrating one engaging element only in another molded surface fastener manufactured in Embodiment 2.
Figure 16:
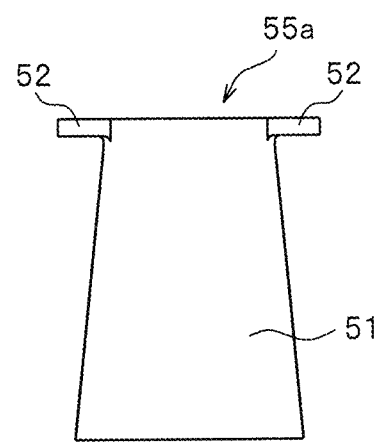
FIG. 16 is a front view illustrating one engaging element only.
Figure 17:
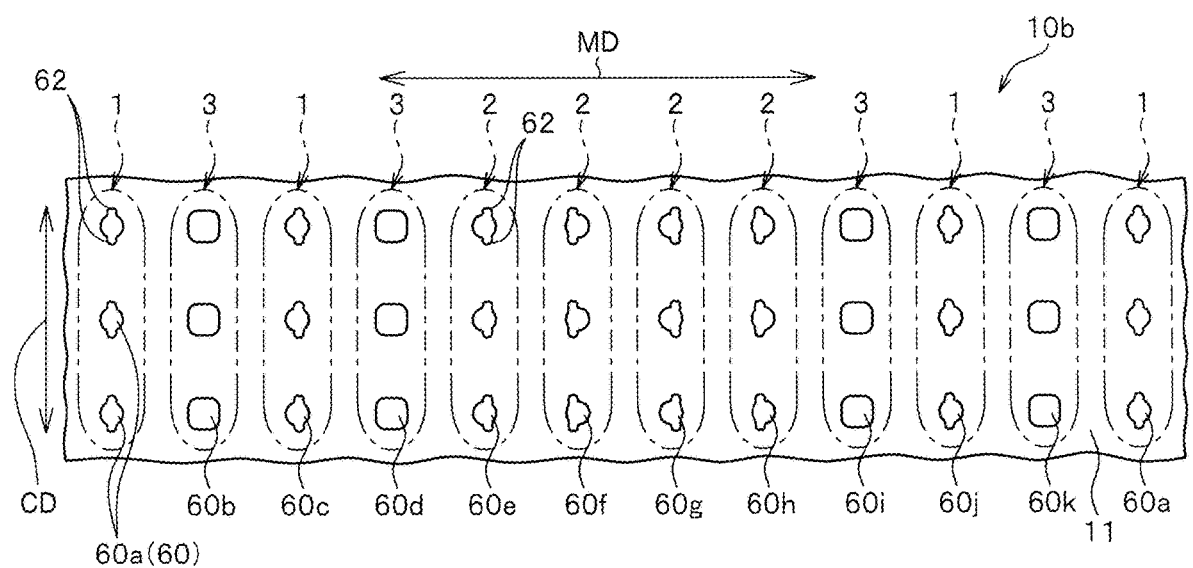
FIG. 17 is a plan view illustrating yet another molded surface fastener manufactured in Embodiment 2.

It is also possible in Embodiment 2 to manufacture the molded surface fastener that, by changing manufacturing conditions of the molded surface fastener, the pawl portions 52 provided on each engaging element are protruded from the upper end part outer peripheral surface of the stem portion 51 parallel to the upper surface of the base portion 11, as the first engaging element 55a of the molded surface fastener according to a first modification example of Embodiment 2 is shown in FIGS. 15 and 16.

Further, in Embodiment 2, it is also possible to manufacture a molded surface fastener 10b according to a second modification example of Embodiment 2 as shown in FIGS. 17 to 21, for example, by changing manufacturing conditions of the molded surface fastener.

In the molded surface fastener 10b according to the second modification example, eleven kinds of engaging elements 60 having different shapes in a plan view of the engaging element 60 which are a first engaging element 60a to an eleventh engaging element 60k are serially disposed as the engaging elements 60 standing on the base portion 11 in the length direction of the molded surface fastener 10b.

In the second modification example, the first engaging element 60a, the third engaging element 60c, the fifth engaging element 60e to the eighth engaging element 60h and the tenth engaging element 60j classified as the first shape elements 1 and the second shape elements 2 have a stem portion 61 and two pawl portions 22 protruded from an upper end part of the stem portion 61, and are formed same as each corresponding engaging element 50 in the molded surface fastener 10*a* of Embodiment 2.

Meanwhile, the second engaging element 60*b*, the fourth engaging element 60*d*, the ninth engaging element 60*i* and the eleventh engaging element 60*k* in the second modification example are formed to have a different shape from the case of the molded surface fastener 10*a* of Embodiment 2. That means, in the molded surface fastener 10*a* of Embodiment 2 as mentioned above, the second engaging element 50*b*, the fourth engaging element 50*d*, the ninth engaging element 50*i* and the eleventh engaging element 50*k* are formed as four-pawl engaging element 50 on which four pawl portions are provided with respect to one stem portion 51.

On the contrary, in the molded surface fastener 10*a* of the second modification example, by flattening the upper end part of the provisional element more smoothly in the secondary molding step using the heat press apparatus 39 in the above-mentioned manufacturing method of Embodiment 2, the second engaging element 60*b*, the fourth engaging element 60*d*, the ninth engaging element 60*i* and the eleventh engaging element 60*k* respectively have a stem portion 61 and an extended portion 64 extending outward from the whole periphery of an outer peripheral surface of the upper end part of the stem portion 61. In this case, the second engaging element 60*b*, the fourth engaging element 60*d*, the ninth engaging element 60*i* and the eleventh engaging element 60*k* respectively have a shape to show a substantially square shape by the upper surface of the stem portion 61 and the upper surface of the extended portion 64 in a plan view of the engaging element 60. In this case, these second engaging element 60*b*, the fourth engaging element 60*d*, the ninth engaging element 60*i* and the eleventh engaging element 60*k* are classified as the third shape element 3 in the second modification example.

In the case of the second modification example, the primary molded body provided with a plurality of provisional elements having different position relations of the provisional pawl portions with respect to the provisional stem portion are formed substantially same as the case of the above-mentioned Embodiment 2 with the primary molding step by the molding apparatus 31 as above. However, after that, the obtained primary molded body is compressed from above under a predetermined condition in the secondary molding step, but the pawl portion protruded from the outer peripheral edge part of the engaging head portion is not formed from the provisional pawl portion, and the engaging element having the extended portion formed such that the provisional pawl portion is compressed to be flatten together with a part of the provisional stem portion. In this case, the extended portion 64 in the engaging element 60 of the second modification example becomes an engaging factor to engage a loop same as the pawl portion 52 in the engaging element 50 of Embodiment 2.

Figure 18:
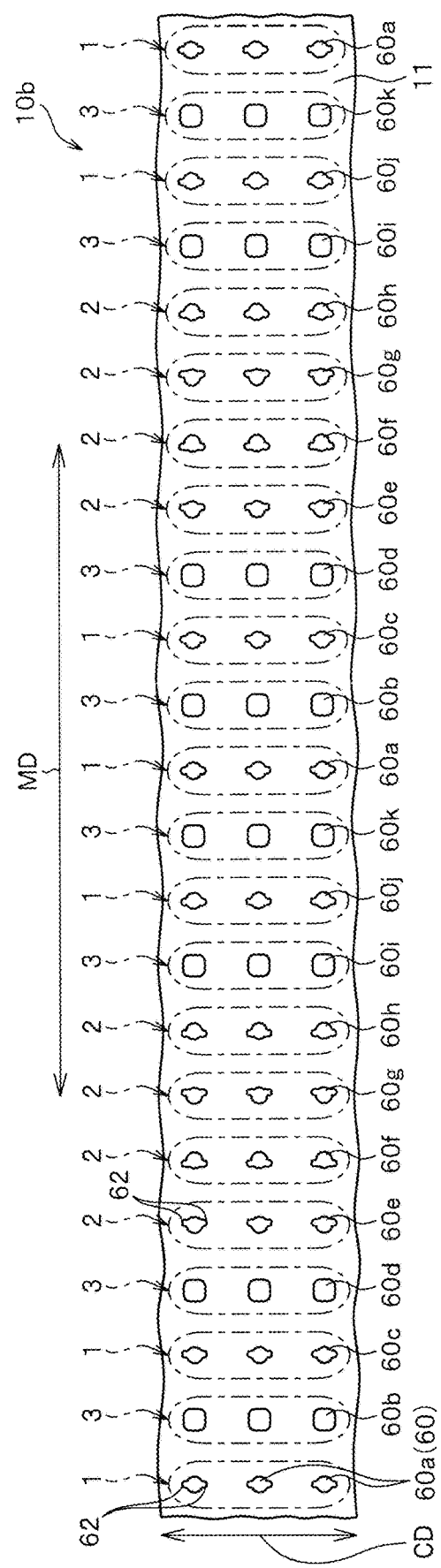
FIG. 18 is a plan view illustrating the molded surface fastener for the length of two cycles.
Figure 19:
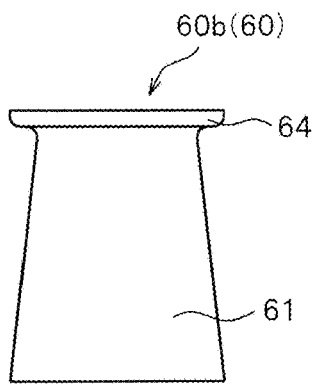
FIG. 19 is an enlarged front view illustrating one engaging element of a molded surface fastener only.
Figure 20:
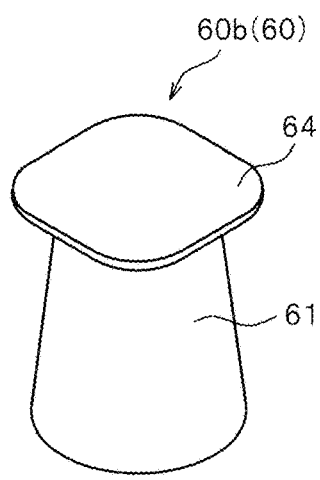
FIG. 20 is a perspective view illustrating one engaging element only.
Figure 21:
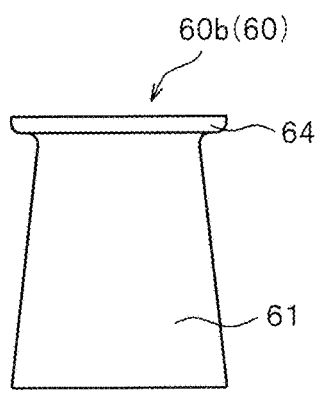
FIG. 21 is a side view illustrating one engaging element only.

Then, in the molded surface fastener 10*b* of the second modification example, the first engaging element 60*a*, the third engaging element 60*c* and the tenth engaging element 60*j* classified as the first shape element 1; the fifth engaging element 60*e* to the eighth engaging element 60*h* classified as the second shape element 2; and the second engaging element 60*e*, the fourth engaging element 60*d*, the ninth engaging element 60*i* and the eleventh engaging element 60*k* classified as the third shape element 3 are respectively disposed cyclically in the length direction of the molded surface fastener 10*b* as eleven engaging elements 20 as one cycle. In FIG. 18, a part that two-cycle eleven kinds of engaging elements 20 are disposed in the molded surface fastener 10*b* is shown. In the present invention, the number of cycle of the engaging elements formed on one molded surface fastener corresponds to the length dimension of the molded surface fastener to be cut.

Also from such a molded surface fastener 10*b* according to the second modification example of Embodiment 2, the same effect as that of the molded surface fastener 10 of the above-mentioned Embodiment 1 can be obtained.

In the molded surface fastener 10*b* of the second modification example, the eleven kinds of engaging elements 60 which are the first engaging element 60*a* to the eleventh engaging element 60*k* are cyclically disposed, and the same kind of engaging elements 60 are disposed at every eleven engaging elements 60 along the length direction of the molded surface fastener 10*b*.

However, as explained in the above-mentioned Embodiment 1, the size of each engaging element 60 in the second modification example is so small that an engaging element 60 without having the shape as designed may be formed in some cases depending on the manufacturing conditions of the molded surface fastener 10*b*. For example, in the manufactured molded surface fastener of the second modification example, it is considered that the second engaging element 60*b* or the eleventh engaging element 60*k* as the third shape element 3 is formed in a shape having four pawl portions same as the second engaging element 50*b* or the eleventh engaging element 50*k* of the above-mentioned Embodiment 2, or only a part of the second engaging elements 60*b* among a plurality of the second engaging elements 60*b* disposed every eleven elements are formed in a shape having four pawl portions (the engaging element 60 provided with four pawl portions is classified as the third shape element 3 even in such a case). Even in such a case, as long as at least two kinds of engaging elements (the first engaging element 60*a* and the fifth engaging element 60*e*, for example) are disposed cyclically at a predetermined cycle of eleven engaging elements 60, the molded fastener is included in the molded surface fastener of the present invention, and the same effect as the case of the above-mentioned Embodiment 1 can be obtained.

Embodiment 3

Figure 22:
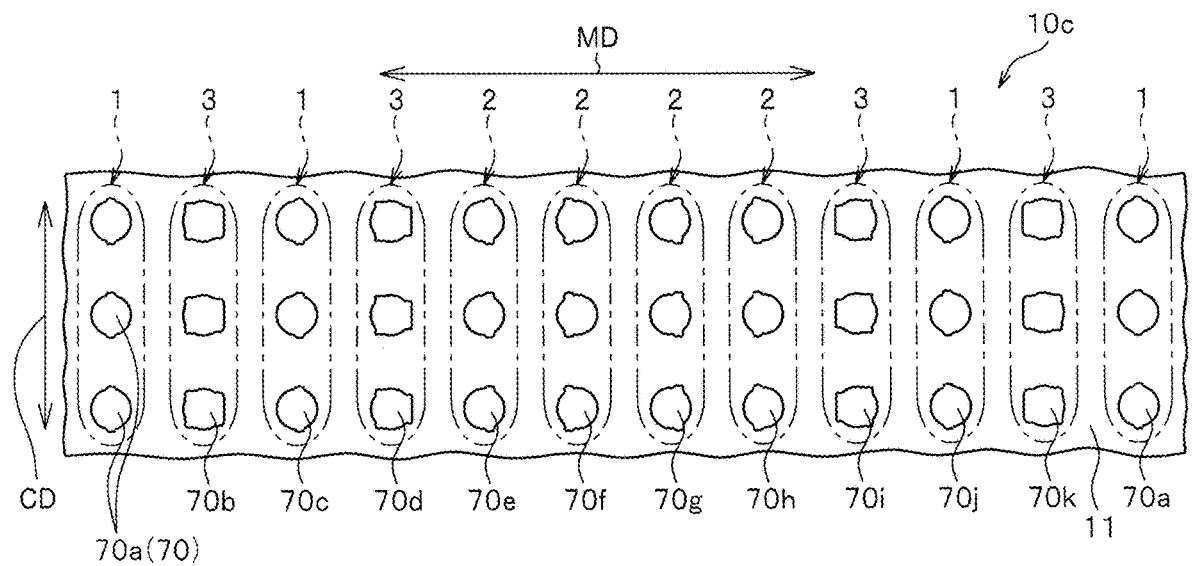
FIG. 22 is a plan view illustrating a molded surface fastener manufactured in Embodiment 3.
Figure 23:
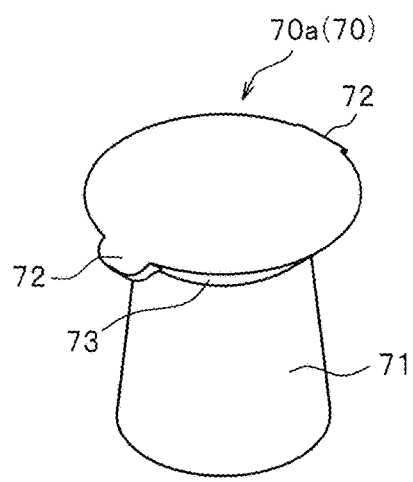
FIG. 23 is an enlarged perspective view illustrating one engaging element of the molded surface fastener only.
Figure 24:
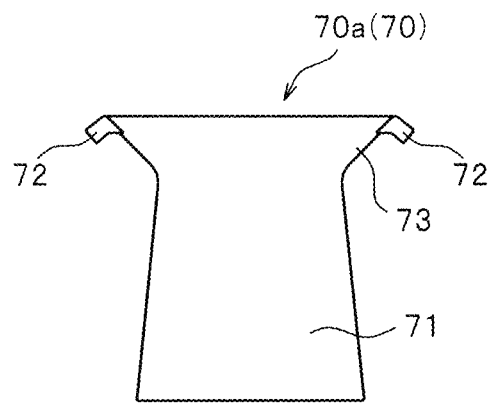
FIG. 24 is a front view of one engaging element only.
Figure 25:
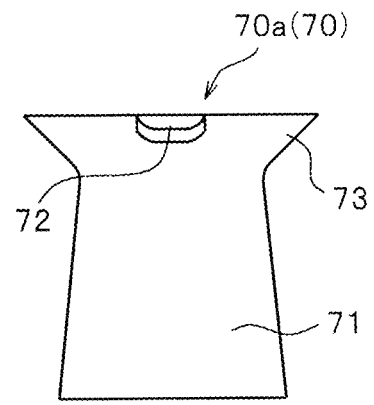
FIG. 25 is a side view illustrating one engaging element only.

FIG. 22 is a plan view illustrating schematically a molded surface fastener manufactured in Embodiment 3. FIG. 23, FIG. 24 and FIG. 25 are an enlarged perspective view, a front view and a side view illustrating one engaging element (first engaging element) of the molded surface fastener.

In Embodiment 3, by using the manufacturing apparatus 30*a* as shown in FIG. 10 as the same as the above-mentioned Embodiment 2, synthetic resin molded surface fastener 10*c* having the flat plate-shaped base portion 11 and a plurality of engaging elements 70 standing on the upper surface of the base portion 11 as shown in FIG. 22 is manufactured.

Particularly in Embodiment 3, in the secondary molding step using the heat press apparatus 39 as shown in FIG. 10, a compressed amount at the time of pressing and flattening the upper end part of the provisional element in the primary molded body is larger than in the case of the above-mentioned Embodiment 2 to manufacture the molded surface fastener 10*c*. In the manufacturing method of Embodiment 3, except for increasing the compressed amount of the provisional element, the primary molding step and the secondary molding step are performed same as the manufacturing method of the above-mentioned Embodiment 2.

In the molded surface fastener 10*c* manufactured in Embodiment 3, a plurality of engaging elements 70 respectively have a stem portion 71 standing up from the base portion 11, an engaging head portion 73 bulging outward from the upper end outer peripheral part of the stem portion 71 and formed integrally to the stem portion 71, and two or four pawl portions 72 protruded outward from the outer peripheral edge part of the engaging head portion 73. Each pawl portion 72 of Embodiment 3 is formed to decline from the outer peripheral edge part of the engaging head portion 73 toward the base portion 11 diagonally downward so that a pawl tip end is hung down.

Also in the molded surface fastener 10c of Embodiment 3, eleven kinds of engaging elements 70 which are a first engaging element 70a to an eleventh engaging element 70k having different position relations of pawl portions 72 each other with respect to the engaging head portion 73 are serially disposed along the length direction (machine direction) of the molded surface fastener 10c, and the same kind of engaging elements 70 are cyclically disposed, as same as the molded surface fastener 10 of the above-mentioned Embodiment 1. The engaging elements 70 disposed in line along the width direction (perpendicular direction) of the molded surface fastener 10c are formed as the same kind of the engaging elements 70.

Also in Embodiment 3, when the eleven kinds of engaging elements 70 are roughly classified into three shapes of the first shape element 1, the second shape element 2 and the third shape element 3, the first shape element 1, the second shape element 2 and the third shape element 3 are disposed at certain placement patterns same as the case of the above-mentioned Embodiment 1 at every cycle of the engaging elements 70.

Then, also by the molded surface fastener 10c of Embodiment 3, the same effect as that of the molded surface fastener 10 of Embodiment 1 as mentioned above can be obtained.

Figure 26:
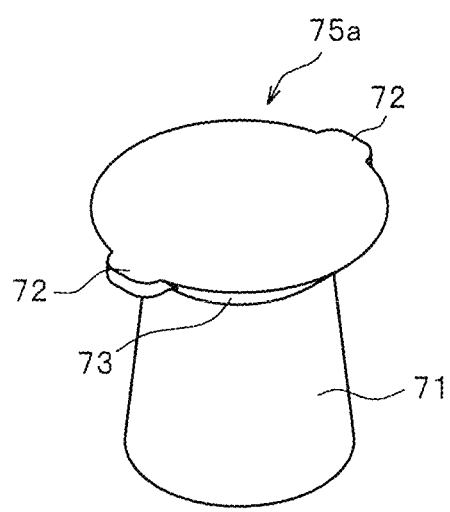
FIG. 26 is an enlarged perspective view illustrating one engaging element of another molded surface fastener manufactured in Embodiment 3 only.
Figure 27:
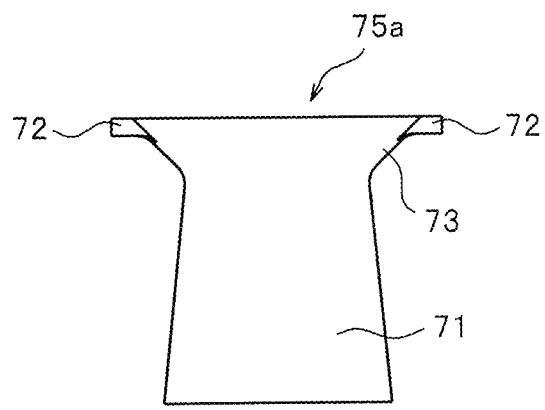
FIG. 27 is a front view illustrating one engaging element only.
Figure 28:
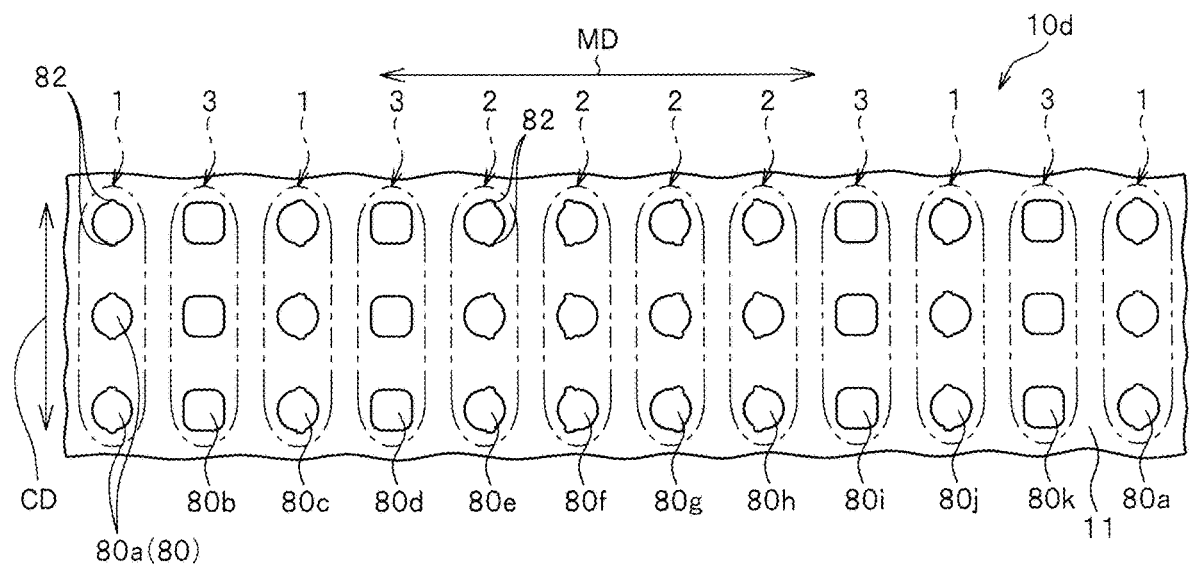
FIG. 28 is a plan view illustrating yet another molded surface fastener manufactured in Embodiment 3.
Figure 29:
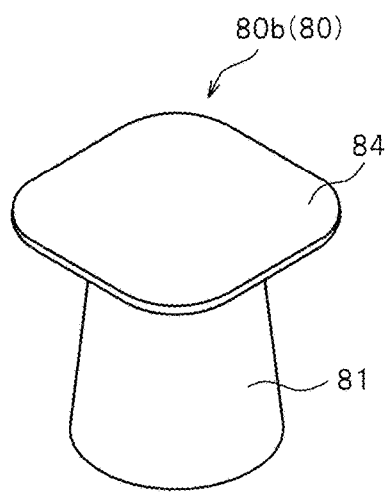
FIG. 29 is an enlarged perspective view illustrating one engaging element of the molded surface fastener only.
Figure 30:
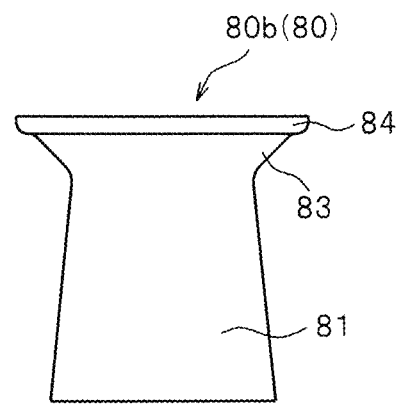
FIG. 30 is a front view illustrating one engaging element only.
Figure 31:
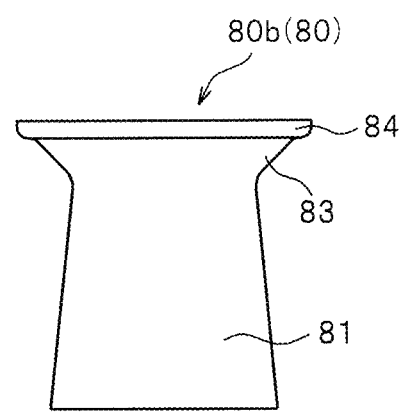
FIG. 31 is a side view illustrating one engaging element only.

In Embodiment 3, it is also possible to manufacture the molded surface fastener that the pawl portions 72 provided on each engaging element are formed to protrude from the engaging head portion 73 parallel to the upper surface of the base portion 11 by changing the manufacturing conditions of the molded surface fastener as the first engaging element 75a of the molded surface fastener according to the first modification example of Embodiment 3 is shown in FIGS. 26 and 27.

Further, in Embodiment 3, it is also possible to manufacture a molded surface fastener 10d that the second engaging element 80b, the fourth engaging element 80d, the ninth engaging element 80i and the eleventh engaging element 80k among the engaging elements 80 respectively have a stem portion 81, an engaging head portion 83 and an extended portion 84 extending outward from the whole periphery of the outer peripheral edge part of the engaging head portion 83, by changing the manufacturing conditions of the molded surface fastener as the second modification example of Embodiment 3 is shown in FIGS. 28 to 31, for example. In this case, the second engaging element 80b, the fourth engaging element 80d, the ninth engaging element 80i and the eleventh engaging element 80k respectively have a shape showing a substantially square shape by the upper surface of the engaging head portion 83 and the upper surface of the extended portion 84 in a plan view of the engaging element 80.

In the second modification example, each engaging element 80 which is the first engaging element 80a, the third engaging element 80c, the fifth engaging element 80e to the eighth engaging element 80h and the tenth engaging element 80j classified as the first shape element 1 and the second shape element 2 has the stem portion 81, the engaging head portion 83 and two pawl portions 82 protruded outward from the outer peripheral edge part of the engaging head portion 83, and is formed same as each corresponding engaging element 50 of the molded surface fastener 10c in Embodiment 3 as mentioned above.

Also by the molded surface fastener 10d according to the first modification example and the second modification example of Embodiment 3 as above, the same effect as that of the molded surface fastener 10 of Embodiment 1 as above can be obtained.

As mentioned above, in the molded surface fastener of the present invention, it is sufficient as long as at least two kinds of engaging elements are cyclically disposed at a predetermined cycle. Therefore, in the molded surface fastener 10c (see FIG. 22) according to Embodiment 3 as above and the molded surface fastener 10d (see FIG. 28) according to the first modification example and the second modification example of Embodiment 3, a part of the engaging elements among the second engaging element, the fourth engaging element the eighth engaging element and the tenth engaging element which are classified as the third shape element may have a shape provided with four pawl portions, and other engaging elements may be formed to have a shape that the extended portion has a shape extending outward from the engaging head portion.

In the above-mentioned Embodiments 1 to 3, the molded surface fastener or the primary molded body of the molded surface fastener is formed by a die wheel having the outer side cylindrical body 33 and the inner side cylindrical body 34 as shown in FIGS. 2 and 3, thereby, the molded surface fastener on which eleven kinds of engaging elements having different position relations of the pawl portions with respect to the stem portion in the length direction are cyclically disposed is manufactured.

In the present invention, however, by changing the size of the penetrating hole MD pitch P1 of the penetrating holes 38 provided on the outer side cylindrical body 33 and the size of the grooved channel MD pitch P3 of the grooved channel portions 40 provided on the inner side cylindrical body 34 appropriately, it is possible to set the least common multiple between the penetrating hole MD pitch P1 and the grooved channel MD pitch P3 at an arbitrary value, or to set the value calculated by dividing the least common multiple by the penetrating hole MD pitch P1 at an arbitrary size. Thereby, it becomes possible to change the number of the kinds of the penetrating holes 38 having different position relations of the grooved channel portions 40 (use grooved channel portions 41) in the outer side cylindrical body 33, or to change the length of the cycle that the same kind of penetrating holes 38 having the same position relation of the grooved channel portions 40 (use grooved channel portions 41) are disposed.

Figure 32:
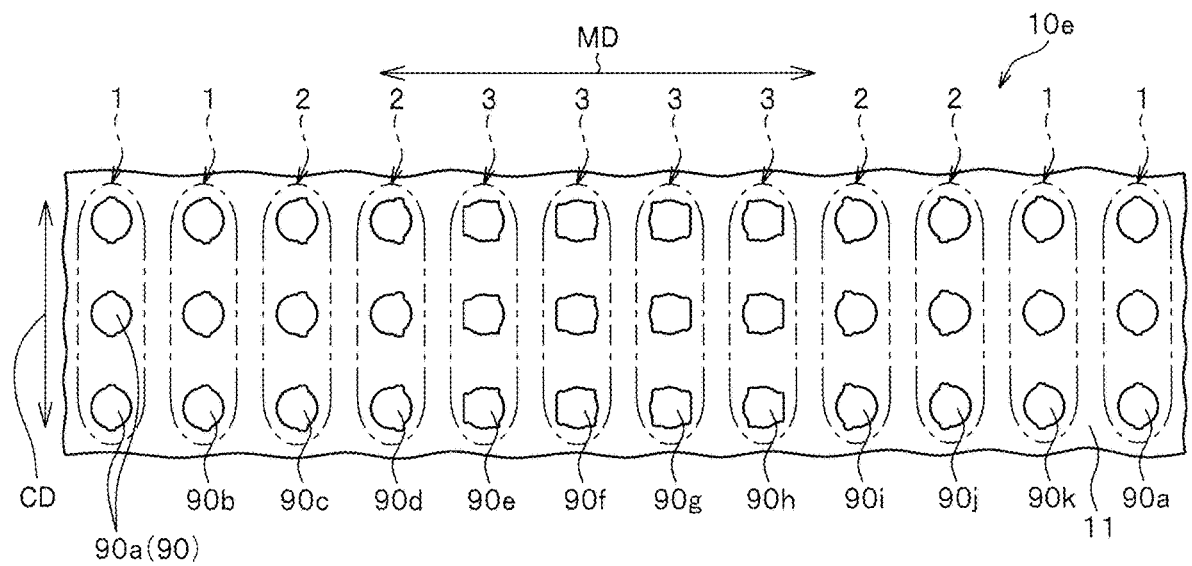
FIG. 32 is a plan view illustrating yet another molded surface fastener manufactured in Embodiment 3.

As a result, as shown in the third modification example of Embodiment 3 in FIG. 32, for example, a molded surface fastener 10e on which eleven kinds of engaging elements 90 having different position relations of pawl portions with respect to the engaging head portion from each other are cyclically disposed along the length direction, and the eleven kinds of engaging elements 90 are disposed at a different placement pattern from the molded surface fastener 10c of Embodiment 3 can be manufactured.

Particularly, in the molded surface fastener 10e according to the third modification example of Embodiment 3, the eleven kinds of engaging elements 90 having different position relations of the pawl portions are cyclically disposed so that the position relations of the pawl portions with respect to the engaging head portion are changed step by step along the length direction of the molded surface fastener 10e.

In this case, the first engaging element 90a, the second engaging element 90b and the eleventh engaging element 90k are formed as the first shape element 1 that the pawl portions are disposed on the center area as mentioned above of the engaging element 90. The third engaging element 90c, the fourth engaging element 90d, the ninth engaging element 90i and the tenth engaging element 90j are formed as the second shape element 2 that the pawl portions are disposed on the first end part area or the second end part area as mentioned above of the engaging element 90. Further, the fifth engaging element 90e to the eighth engaging element 90h are formed as the third shape element 3 that four pawl portions (two sets of a right and left pair of the pawl portions) are provided per one engaging element 90. Then, the first shape element 1, the second shape element 2 and the third shape element 3 are disposed at a certain placement pattern at every cycle of the eleven kinds of engaging elements 90 in the length direction.

Figure 33:
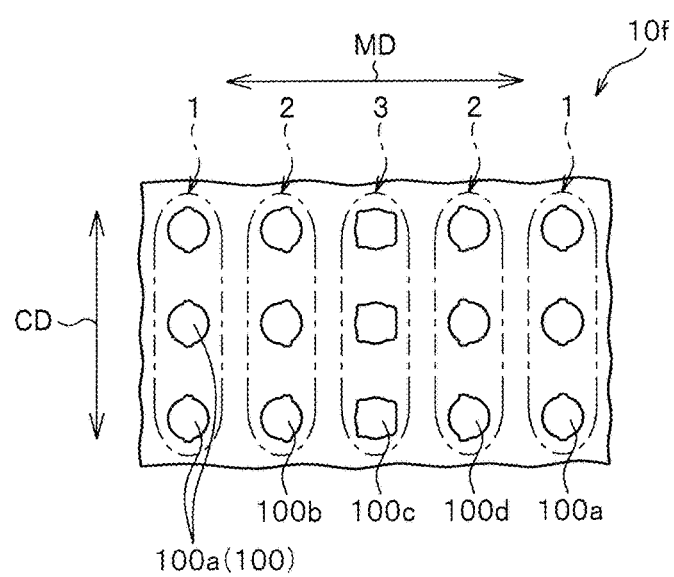
FIG. 33 is a plan view illustrating yet another molded surface fastener manufactured in Embodiment 3.

Further in the present invention, by changing the size of the above-mentioned penetrating hole MD pitch P1 of the outer side cylindrical body 33 and the size of the above-mentioned grooved channel MD pitch P3 in the inner side cylindrical body 34, it is also possible to manufacture a molded surface fastener 10f that the kinds of the engaging elements 100 having different position relations of the pawl portions are fewer than in the case of Embodiment 3, as the fourth modification example of Embodiment 3 is shown in FIG. 33, for example.

In the case of the fourth modification example of Embodiment 3, for example, the penetrating hole MD pitch P1 is set at 600 μm, and the grooved channel MD pitch P3 is set at 160 μm. Therefore, the least common multiple between the penetrating hole MD pitch P1 (600 μm) and the grooved channel MD pitch P3 (160 μm) is 2400 μm. The value (the number of the penetrating holes forming one cycle, and the number of engaging elements disposed on one cycle) calculated by dividing the least common multiple by the penetrating hole MD pitch P1 is "4".

Therefore, in the molded surface fastener 10f according to the fourth modification example of Embodiment 3, four kinds of engaging elements 100 having different position relations of the pawl portions with respect to the engaging head portion are cyclically disposed along the length direction. In this case, the four kinds of engaging elements 100 are serially disposed such that the position relations of the pawl portions with respect to the engaging head portion are changed step by step along the length direction of the molded surface fastener 10f.

In this case, the first engaging element 100a is formed as the first shape element 1 that the pawl portions are disposed on the center area as mentioned above of the engaging element 100. The second engaging element 100b and the fourth engaging element 100d are formed as the second shape element 2 that the pawl portions are disposed on the first end part area or the second end part area as mentioned above of the engaging element 100. Further, the third engaging element 100c is formed as the third element 3 that four pawl portions are provided to one engaging element 100. Then, the first shape element 1, the second shape element 2 and the third shape element 3 are disposed at constant placement patterns at every cycle of the engaging element 100 in the length direction.

In the present invention, it is possible to easily change the position relations of the pawl portions disposed on each engaging element with respect to the stem portion or the engaging head portion, or the shape and the size of the pawl portions disposed on each engaging element by changing a dimension, a forming pattern and a shape of the grooved portion (groove channel portion or a depressed portion) grooved on the outer peripheral surface of the inner side cylindrical body 34 of the die wheel 32.

Forming patterns of the grooved channel portions or depressed portions provided on the inner side cylindrical body 34 are here explained with reference to some modification examples using the drawings. FIGS. 34 to 38 are main part schematic views schematically illustrating the grooved channel portions or the depressed portions provided on the inner side cylindrical body 34 in each modification examples, and position relations between the grooved channel portions or depressed portions and penetrating holes 38 provided on the outer side cylindrical body 33.

Figure 34:
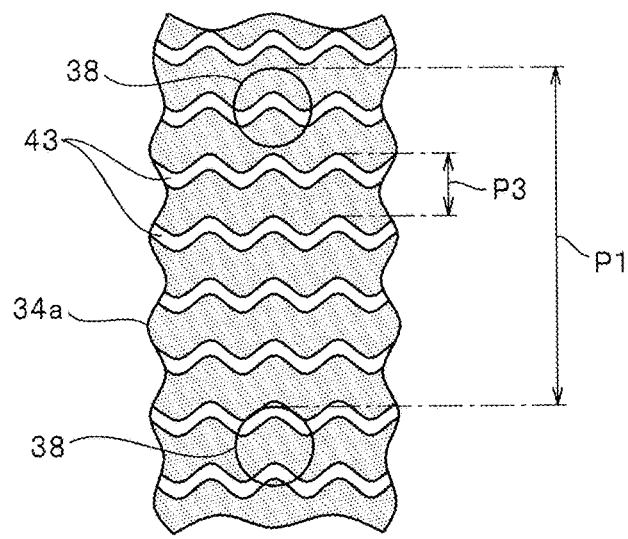
FIG. 34 is a main part schematic view illustrating a position relation between penetrating holes of an outer side cylindrical body and grooved channel portions of an inner side cylindrical body according to modification example 1.

In the modification example 1 regarding the forming pattern of the grooved channel portions as shown in FIG. 34, a plurality of grooved channel portions 43 meandering in a wavy shape along C direction are grooved at predetermined grooved channel MD pitch P3 on the outer peripheral surface of the inner side cylindrical body 34a. Using the inner side cylindrical body 34a according to the modification example 1 enables to manufacture the molded surface fastener having a different shape and a dimension from the above-mentioned Embodiments 1 to 3 and on which at least one pawl portion is provided on the engaging element.

Figure 35:
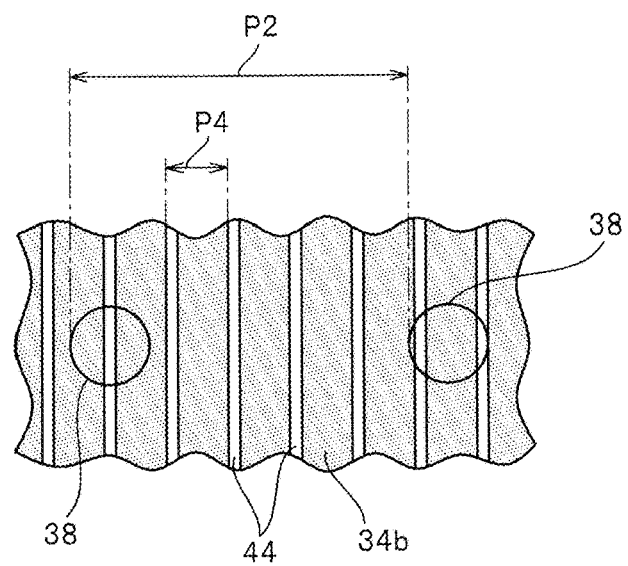
FIG. 35 is a main part schematic view illustrating a position relation between penetrating holes of an outer side cylindrical body and grooved channel portions of an inner side cylindrical body according to modification example 2.

In the modification example 2 as shown in FIG. 35, a plurality of grooved channel portions 44 are grooved linearly along M direction on the outer peripheral surface of the inner side cylindrical body 34b. In this case, the penetrating hole CD pitch P2 and the grooved channel CD pitch are set so that the size of the least common multiple between the size of the penetrating hole CD pitch P2 of the penetrating holes 38 provided on the outer side cylindrical body 33 and the grooved channel CD pitch P4 of the grooved channel portions 44 in the inner side cylindrical body 34b is larger than the penetrating hole CD pitch P2, thereby the molded surface fastener on which a plurality of kinds of engaging elements having different position relations of the pawl portions with respect to the stem portion or the engaging head portion are cyclically disposed along the width direction of the base portion can be manufactured.

Figure 36:
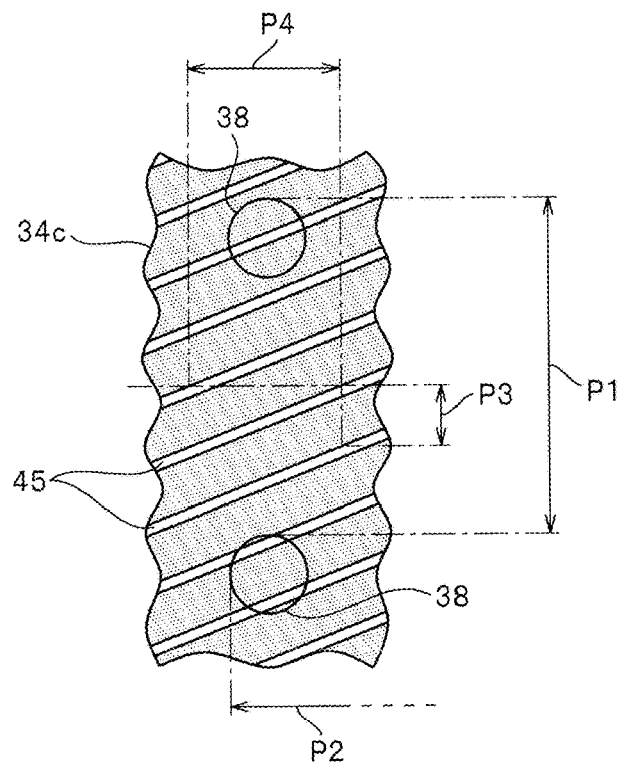
FIG. 36 is a main part schematic view illustrating a position relation between penetrating holes of an outer side cylindrical body and grooved channel portions of an inner side cylindrical body according to modification example 3.

In the modification example 3 shown in FIG. 36, a plurality of the grooved channel portions 45 are grooved along an oblique direction at a predetermined angle with respect to C direction or M direction on the outer peripheral surface of the inner side cylindrical body 34c. In this case, the penetrating hole MD pitch P1 and the grooved channel MD pitch P3 are set so that the size of the least common multiple between the penetrating hold MD pitch P1 of the penetrating hole 38 provided on the outer side cylindrical body 33 and the grooved channel MD pitch P3 of the grooved channel portion 45 in the inner side cylindrical body 34 is larger than the penetrating hole MD pitch P1, thereby the molded surface fastener on which a plurality of kinds of engaging elements having different position relations of the pawl portions with respect to the stem portion or the engaging head portion from each other are cyclically disposed can be manufactured.

Further, the penetrating hole CD pitch P2 and the grooved channel CD pitch P4 are set so that the size of the least common multiple between the size of the penetrating hole CD pitch P2 of the penetrating hole 38 provided on the outer side cylindrical body 33 and the grooved channel CD pitch P4 of the grooved channel portion 45 in the inner side cylindrical body 34*c* is larger than the penetrating hole CD pitch P2, thereby the molded surface fastener on which a plurality of kinds of engaging elements having different position relations of the pawl portions with respect to the stem portion or the engaging head portion are cyclically disposed along the width direction of the base portion can be manufactured.

Figure 37:
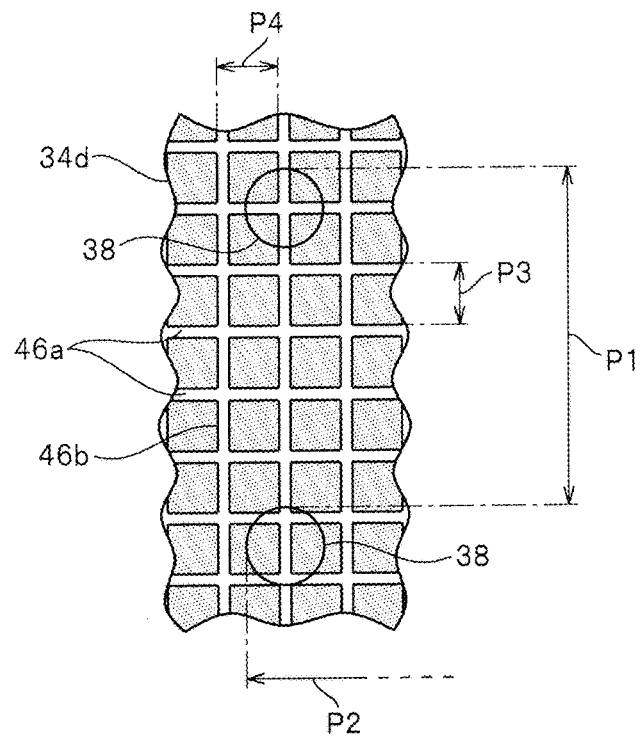
FIG. 37 is a main part schematic view illustrating a position relation between penetrating holes of an outer side cylindrical body and grooved channel portions of an inner side cylindrical body according to modification example 4.

In the modification example 4 shown in FIG. 37, a plurality of the first grooved channel portions 46*a* are grooved linearly along C direction, and a plurality of the second grooved channel portions 46*b* are grooved linearly along M direction on the outer peripheral surface of the inner side cylindrical body 34*d*. That is, in the modification example 4, a plurality of the first grooved channel portions 46*a* in C direction and a plurality of the second grooved channel portions 46*b* in M direction are provided on the outer peripheral surface of the inner side cylindrical body 34*d* in a lattice shape.

In this case, by appropriately setting the size of the penetrating hole MD pitch P1 and the penetrating hole CD pitch P2 of the penetrating hole 38 provided on the outer side cylindrical body 33 and the size of the grooved channel MD pitch P3 of the first grooved channel portion 46*a* and the grooved channel CD pitch P4 of the second grooved channel portion 46*b*, the molded surface fastener on which a plurality of kinds of engaging elements having different position relations of the pawl portions with respect to the stem portion or the engaging head portion are cyclically disposed along the length direction and/or the width direction of the base portion 11 can be manufactured.

Further in the present invention, it is also possible that a plurality of third grooved channel portions disposed along an oblique direction at an angle of 45° with respect to C direction or M direction and a plurality of fourth grooved channel portions disposed in an oblique direction at −45° angle with respect to C direction or M direction are grooved to be further added on the outer peripheral surface of the inner side cylindrical body 34*d* of the modification example 4 shown in FIG. 37. It is also possible to manufacture the molded surface fastener using such a die wheel having the inner side cylindrical body on which the first grooved channel portions 46*a* in M direction, the second grooved channel portions 46*b* in C direction, and the third and fourth grooved channel portions oblique in a diagonal direction in an opposite direction each other are provided.

Figure 38:
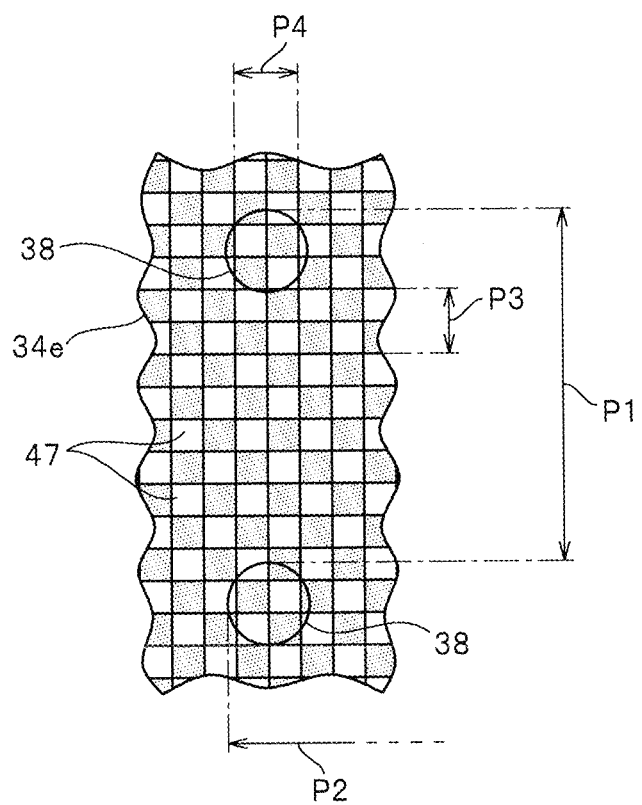
FIG. 38 is a main part schematic view illustrating a position relation between penetrating holes of an outer side cylindrical body and grooved channel portions of an inner side cylindrical body according to modification example 5.
Figure 39:
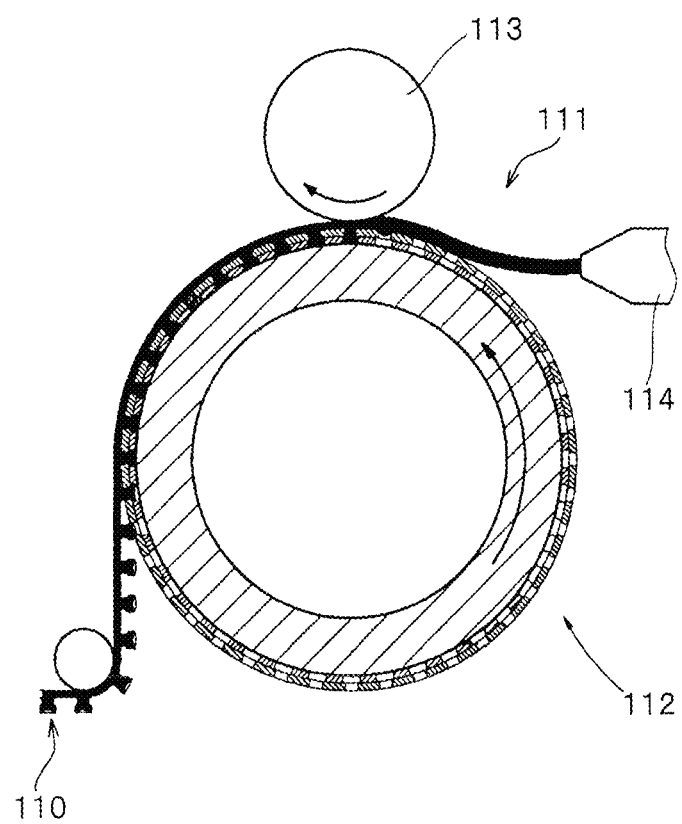
FIG. 39 is a schematic view illustrating schematically a conventional molding apparatus.
Figure 40:
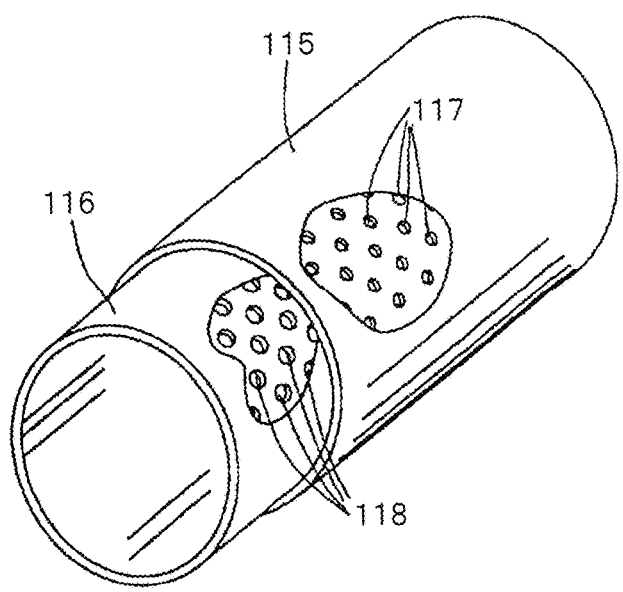
FIG. 40 is a perspective view illustrating a conventional outside screen and an inside screen.
Figure 41:
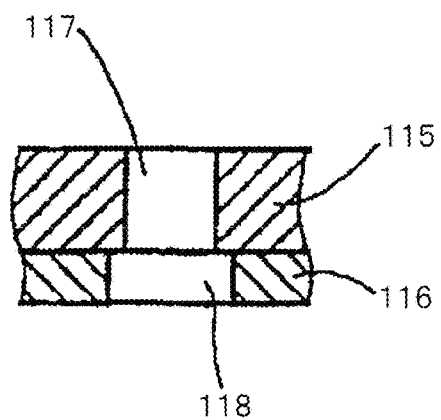
FIG. 41 is an enlarged cross-sectional view of a main part illustrating the conventional outside screen and the inside screen.

In the modification example 5 shown in FIG. 38, a plurality of square-shaped depressed portions 47 are grooved on the outer peripheral surface of the inner side cylindrical body 34*e* so that checkered patterns are formed by the depressed portions 47 and the outer peripheral surface of the inner side cylindrical body 34*e*. In this case, by appropriately setting the size of the penetrating hole MD pitch P1 and the penetrating hole CD pitch P2 of the penetrating holes 38 provided on the outer side cylindrical body 33, and the depressed portion MD pitch P3 and the depressed portion CD pitch P4 of the square-shaped depressed portions 47, the molded surface fastener on which plural kinds of engaging elements having different position relations of the pawl portions with respect to the stem portion or the engaging head portion are cyclically disposed along the length direction and/or the width direction of the base portion can be manufactured.

In the present invention, instead of the plurality of square-shaped depressed portions as in the modification example 5 shown in FIG. 38, it is also possible to grooved a plurality of hexagonal-shaped depressed portions not shown in the drawing so as to form turtle shell patterns on the outer peripheral surface of the inner side cylindrical body.

Further, in the above-mentioned Embodiments 1 to 3, the case is explained that the molded surface fastener or the primary molded body of the molded surface fastener is molded using a molding apparatus 31 having the die wheel 32 shown in FIG. 2. However, in the present invention, it is also possible to use a molding apparatus having another shape in molding the molded surface fastener or the primary molded body of the molded surface fastener.

As an example of the molding apparatus in another shape, it is possible to use an apparatus having a die wheel driving rotationally in one direction, a press wheel disposed with a predetermined interval from the die wheel and driving rotationally in the opposite direction to the die wheel and an extrusion nozzle discharging molten synthetic resin material between the die wheel and the press wheel. In this case, the die wheel of the molding apparatus according to the shape has a same structure to the die wheel 32 explained in the above-mentioned Embodiment 1 and the like. Also by using the molding apparatus in this shape, the molded surface fastener explained in the above-mentioned Embodiments 1 to 3 can be stably manufactured.

REFERENCE SIGNS LIST

1 First shape element
2 Second shape element
3 Third shape element
5 First end part area
6 Center area
7 Second end part area
10, 10*a* Molded surface fastener
10*b*, 10*c* Molded surface fastener
10*d*, 10*e* Molded surface fastener
10*f* Molded surface fastener
11 Base portion
20 Engaging element
20*a*-20*k* First engaging element to eleventh engaging element
21 Stem portion
22 Pawl portion
23 Rib portion
30, 30*a* Manufacturing apparatus
31 Molding apparatus
32 Die wheel
33 Outer side cylindrical body
34, 34*a* Inner side cylindrical body
34*b*, 34*c* Inner side cylindrical body
34*d*, 34*e* Inner side cylindrical body
35 Rotational driving roller
36 Extrusion nozzle
37 Pickup roller
37*a* Upper holding roller
37*b* Lower holding roller
38 Penetrating hole
39 Heat press apparatus
39*a* Upper press roller (calender roller)
39*b* Lower press roller (calender roller)
40 Grooved channel portion (grooved portion)
41 Use grooved channel portion
42 Non-use grooved channel portion
43, 44, 45 Grooved channel portion
46*a* First grooved channel portion
46*b* Second grooved channel portion
47 Depressed portion
50 Engaging element 50a-50k First engaging element to eleventh engaging element
51 Stem portion
52 Pawl portion
55a First engaging element
60 Engaging element
60a-60k First engaging element to eleventh engaging element
61 Stem portion
62 Pawl portion
64 Extended portion
70 Engaging element
71 Stem portion
72 Pawl portion
73 Engaging head portion
75a First engaging element
80 Engaging element
80a-80k First engaging element to eleventh engaging element
81 Stem portion
82 Pawl portion
83 Engaging head portion
84 Extended portion
90 Engaging element
90a-90k First engaging element to eleventh engaging element
100 Engaging element
100a-100d First engaging element to fourth engaging element
P1 Penetrating hole MD pitch
P2 Penetrating hole CD pitch
P3 Grooved channel MD pitch or depressed portion MD pitch
P4 Grooved channel CD pitch or depressed portion CD pitch

The invention claimed is:

1. A molding apparatus having a die wheel driving rotationally in one direction and an extrusion nozzle discharging a molten synthetic resin material toward the die wheel, and used for manufacturing a synthetic resin molded surface fastener on which a plurality of engaging elements stand on an upper surface of a base portion, wherein:

the die wheel has a concentric double cylinder structure provided with an outer side cylindrical body and an inner side cylindrical body disposed in close contact with an inner peripheral surface of the outer side cylindrical body, a plurality of penetrating holes penetrating the outer side cylindrical body from an outer peripheral surface to the inner peripheral surface are provided, a plurality of grooved portions are grooved on an outer peripheral surface of the inner side cylindrical body, more grooved portions of the inner side cylindrical body are provided than the penetrating holes of the outer side cylindrical body in a certain region in a reference direction when at least one direction is defined as the reference direction, an outer peripheral edge of each penetrating hole on the inner peripheral surface of the outer side cylindrical body has a part overlapping the grooved portion of the inner side cylindrical body and a part in close contact with the outer peripheral surface of the inner side cylindrical body, and the grooved portions disposed on the inner side cylindrical body include a use grooved portion disposed to intersect with the penetrating hole in the outer side cylindrical body and into which the molten synthetic resin material can be flowed, and a non-use grooved portion disposed between the penetrating holes adjacent to each other on the outer side cylindrical body and covered by the inner peripheral surface of the outer side cylindrical body.

2. The molding apparatus according to claim 1, wherein:
a plurality of the penetrating holes are provided on the outer side cylindrical body to have a constant penetrating hole pitch in the reference direction,
a plurality of the grooved portions are provided on the inner side cylindrical body to have a constant grooved portion pitch in the reference direction, and
a size of the grooved portion pitch is smaller than a size of the penetrating hole pitch.

3. The molding apparatus according to claim 2, wherein:
the penetrating holes disposed in the reference direction of the outer side cylindrical body include at least two kinds of the penetrating holes having different position relations of the use grooved portions with respect to the penetrating holes from each other, and
a same kind of the penetrating holes having the same position relation of the use grooved portions with respect to the penetrating holes are disposed at a constant cycle along the reference direction.

4. The molding apparatus according to claim 2, wherein the penetrating holes of the outer side cylindrical body and the grooved portions of the inner side cylindrical body are disposed to have the least common multiple between a size of the penetrating hole pitch and a size of the grooved portion pitch larger than the size of the penetrating hole pitch.

5. The molding apparatus according to claim 4, wherein a value calculated by dividing the least common multiple by the size of the penetrating hole pitch is less than 40.

6. The molding apparatus according claim 2 wherein the size of the grooved portion pitch is smaller than the size of the penetrating hole of the outer side cylindrical body in the reference direction.

7. The molding apparatus according to claim 1 wherein the penetrating holes disposed adjacent to each other in the reference direction are provided to have different position relations of the use grooved portions with respect to the penetrating holes from each other.

8. The molding apparatus according to claim 1 wherein the reference direction is a machine direction of the die wheel.

9. A manufacturing method of a synthetic resin molded surface fastener in which a plurality of engaging elements stand on an upper surface of a base portion wherein:
the method includes molding the synthetic resin molded surface fastener using a molding apparatus having a die wheel driving rotationally in one direction and an extrusion nozzle discharging a molten synthetic resin material toward the die wheel, wherein the die wheel has a concentric double cylinder structure provided with an outer side cylindrical body and an inner side cylindrical body disposed in close contact with an inner peripheral surface of the outer side cylindrical body,
wherein
the method including using the die wheel in which a plurality of penetrating holes penetrating the outer side cylindrical body from an outer peripheral surface to the inner peripheral surface are provided, a plurality of grooved portions are grooved on an outer peripheral surface of the inner side cylindrical body, more grooved portions of the inner side cylindrical body are provided than the penetrating holes of the outer side cylindrical body in a certain region in a reference direction when at least one direction is defined as the reference direction, an outer peripheral edge of each penetrating hole on the inner peripheral surface of the outer side cylindrical body has a part overlapping the grooved portion of the inner side cylindrical body and a part in close contact with the outer peripheral surface of the inner side cylindrical body, and the grooved portions disposed on the inner side cylindrical body include a use grooved portion disposed to intersect with the penetrating hole on the outer side cylindrical body and into which the molten synthetic resin material can be flowed, and a non-use grooved portion disposed between the penetrating holes adjacent to each other on the outer side cylindrical body and covered by the inner peripheral surface of the outer side cylindrical body.

10. A manufacturing method of a molded surface fastener by conducting a primary molding step molding a primary molded body in which a plurality of provisional elements stand on an upper surface of a base portion using a molding apparatus having a die wheel driving rotationally in one direction and an extrusion nozzle discharging a molten synthetic resin material toward the die wheel, wherein the die wheel has a concentric double cylinder structure provided with an outer side cylindrical body and an inner side cylindrical body disposed in close contact with an inner peripheral surface of the outer side cylindrical body, and a secondary molding step heating and compressing a part of each provisional element of the primary molded body from above, wherein:

the method including using the die wheel in which a plurality of penetrating holes penetrating the outer side cylindrical body from an outer peripheral surface to the inner peripheral surface are provided, a plurality of grooved portions are grooved on an outer peripheral surface of the inner side cylindrical body, more grooved portions of the inner side cylindrical body are provided than the penetrating holes of the outer side cylindrical body in a certain region in a reference direction when at least one direction is defined as the reference direction, an outer peripheral edge of each penetrating hole on the inner peripheral surface of the outer side cylindrical body has a part overlapping the grooved portion of the inner side cylindrical body and a part in close contact with the outer peripheral surface of the inner side cylindrical body, and the grooved portions disposed on the inner side cylindrical body include a use grooved portion disposed to intersect with the penetrating hole in the outer side cylindrical body and into which the molten synthetic resin material can be flowed, and a non-use grooved portion disposed between the penetrating holes adjacent to each other on the outer side cylindrical body and covered by the inner peripheral surface of the outer side cylindrical body.

11. The manufacturing method of the molded surface fastener according to claim 9 including using the die wheel in which a plurality of the penetrating holes are provided on the outer side cylindrical body to have a constant penetrating hole pitch in the reference direction, a plurality of the grooved portions are provided on the inner side cylindrical body to have a constant grooved portion pitch in the reference direction, and a size of the grooved portion pitch is smaller than a size of the penetrating hole pitch.

12. The manufacturing method of the molded surface fastener according to claim 9 including using the die wheel in which the penetrating holes disposed in the reference direction of the outer side cylindrical body include at least two kinds of the penetrating holes having different position relations of the use grooved portions with respect to the penetrating hole from each other, and a same kind of the penetrating holes having the same position relation of the use grooved portions with respect to the penetrating hole are disposed at a constant cycle along the reference direction.

13. The manufacturing method of the molded surface fastener according to claim 9 including using the die wheel in which the penetrating holes of the outer side cylindrical body and the grooved portions of the inner side cylindrical body are disposed to have the least common multiple between a size of the penetrating hole pitch and a size of the grooved portion pitch larger than the size of the penetrating hole pitch.

14. The manufacturing method of the molded surface fastener according to claim 10 including using the die wheel in which a plurality of the penetrating holes are provided on the outer side cylindrical body to have a constant penetrating hole pitch in the reference direction, a plurality of the grooved portions are provided on the inner side cylindrical body to have a constant grooved portion pitch in the reference direction, and a size of the grooved portion pitch is smaller than a size of the penetrating hole pitch.

15. The manufacturing method of the molded surface fastener according to claim 10 including using the die wheel in which the penetrating holes disposed in the reference direction of the outer side cylindrical body include at least two kinds of the penetrating holes having different position relations of the use grooved portions with respect to the penetrating hole from each other, and a same kind of the penetrating holes having the same position relation of the use grooved portions with respect to the penetrating hole are disposed at a constant cycle along the reference direction.

16. The manufacturing method of the molded surface fastener according to claim 10 including using the die wheel in which the penetrating holes of the outer side cylindrical body and the grooved portions of the inner side cylindrical body are disposed to have the least common multiple between a size of the penetrating hole pitch and a size of the grooved portion pitch larger than the size of the penetrating hole pitch.

* * * * *

UNITED STATES PATENT AND TRADEMARK OFFICE
CERTIFICATE OF CORRECTION

| | |
|---|---|
| PATENT NO. | : 11,633,021 B2 |
| APPLICATION NO. | : 17/160065 |
| DATED | : April 25, 2023 |
| INVENTOR(S) | : Makoto Takekawa et al. |

It is certified that error appears in the above-identified patent and that said Letters Patent is hereby corrected as shown below:

In the Claims

In Column 40, Line 35, in Claim 6, after "according" insert -- to --.

Signed and Sealed this
Twentieth Day of June, 2023

Katherine Kelly Vidal
*Director of the United States Patent and Trademark Office*